(12) United States Patent
Boright et al.

(10) Patent No.: US 7,058,511 B2
(45) Date of Patent: Jun. 6, 2006

(54) SUB-VISIBLE CLOUD COVER ASSESSMENT: VNIR-SWIR

(75) Inventors: Arthur L. Boright, Bonney Lake, WA (US); John C. Sluder, Kent, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 10/815,144

(22) Filed: Mar. 31, 2004

(65) Prior Publication Data

US 2005/0114026 A1 May 26, 2005

Related U.S. Application Data

(63) Continuation-in-part of application No. 10/720,290, filed on Nov. 24, 2003.

(51) Int. Cl.
*G06F 19/00* (2006.01)
(52) U.S. Cl. .......................... 702/3; 382/100; 345/426
(58) Field of Classification Search ................ 702/1–6; 382/100, 109; 345/426; 73/170.16; 356/336
See application file for complete search history.

(56) References Cited

U.S. PATENT DOCUMENTS

| | | | |
|---|---|---|---|
| 4,465,940 A | 8/1984 | Graff et al. | 348/25 |
| 4,921,349 A | 5/1990 | Richards | 356/229 |
| 5,075,856 A | 12/1991 | Kneizys et al. | 702/3 |
| 5,088,833 A | 2/1992 | Tsang et al. | 374/17 |
| 6,531,701 B1 | 3/2003 | Chou et al. | 250/339.08 |
| 6,697,065 B1 * | 2/2004 | Furuhashi et al. | 345/426 |
| 2005/0036661 A1 * | 2/2005 | Viggh | 382/109 |

OTHER PUBLICATIONS

Ackerman, S. A., et al., "Discriminating Clear Sky From Clouds With MODIS," Journal of Geophysical Research, Dec. 27, 1998, vol. 103, No. D24, pp. 32, 141-32, 157.

Adler-Golden, S.M., et al., "An Algorithm for De-Shadowing Spectral Imagery," presented at the AVIRIS Earth Sciences and Applications Workshop, at the NASA Jet Propulsion Laboratory (2002).

Boardman, J. W., 1993, "Automating Spectral Unmixing of AVIRIS Data Using Convex Geometry Concepts," in: Summaries of the Fourth Annual JPL Airborne Geoscience Workshop, Washington, D.C., v. 1.

(Continued)

*Primary Examiner*—John Barlow
*Assistant Examiner*—Victor J. Taylor
(74) *Attorney, Agent, or Firm*—Black Lowe & Graham, PLLC

(57) ABSTRACT

Methods, computer-readable media, and systems are provided for determining whether a data point indicates a presence of a sub-visible cloud using visible near-infrared data and short wavelength infrared data. A data point is selected from an imaging study of an area potentially covered by at least one of visible clouds and sub-visible clouds. A presence of a sub-visible cloud is determined. The determination is made by comparing a cirrus-band reflectance of the data point with a sub-visible cirrus-band reflectance threshold. The data point is classified as a sub-visible cloud point if the cirrus-band reflectance of the data point exceeds the sub-visible cirrus band reflectance threshold.

53 Claims, 9 Drawing Sheets

OTHER PUBLICATIONS

Choi, K-Y., et al., "A Multispectral Transform for the Suppression of Cloud Shadows," presented at the Fourth International Airborne Remote Sensing Conf. and Exhibition/21st Canadian Symposium on Remote Sensing, Ottawa, Ontario, Canada, Jun. 11-14, 1999.

Diner, D. J., et al., "Earth Observing System Multi-angle Imaging Spectro-Radiometer (MISR) Level 1 Cloud Detection Algorithm Theoretical Basis," Jet Propulsion Laboratory, California Institute of Technology, Dec. 7, 1999, vol. D-13397, Rev. B, pp 1-38.

Gao, B-C., et al., An Algorithm Using Visible and 1.38-μm Channels to Retrieve Cirrus Cloud Reflectances from Aircraft and Satellite Data, IEEE Transactions on Geoscience and Remote Sensing, Aug. 2002, vol. 40, No. 8, pp. 1659-1668.

Gao, B-C., and Kaufman, Y. J., "Selection of the 1.375- μm MODIS Channel for Remote Sensing of Cirrus Clouds and Stratospheric Aerosols from Space," American Meterological Society, Journal of the Atmospheric Sciences, Dec. 1, 1995, vol. 52, No. 23, pp. 4231-4237.

Gao, B-C., et al., "Correction of Thin Cirrus Path Radiances in the 0.4-1.0 μm Spectral Region Using the Sensitive 1.375 μm Cirrus Detecting Channel," J. Geophy. Research, Dec. 27, 1998, vol. 103, No. D24, pp. 32, 169-32, 176.

Goodman, A. H. and Henderson-Sellers, A., "Cloud Detection and Analysis: A Review of Recent Progress," Atmospheric Research, 1988, vol. 21, Nos. 3-4, pp. 229-240.

Gwinner, K., et al., "A Case Study on the Influence of Shadows and Shading on Multispectral Airborne Imaging Data," presented at the Third International Airborne Remote Sensing Conf. and Exhibition, Jul. 7-10, 1997 Copenhagen, Denmark.

Irish, R.R., "Landsat 7 Automatic Cloud Cover Assessment, in Algorithms for Multispectral, Hyperspectral, and Ultraspectral Imagery VI," S. S. Chen, M. R. Descour, Editors, Proceedings of SPIE, 2000, vol. 4049, pp. 348-355.

King, M. D., et al., "Discriminating Heavy Aerosol, Clouds, and Fires During SCAR-B: Application of Airborne Multispectral MAS Data," J. Geophy. Research, Dec. 27, 1998, vol. 103, No. D24, pp. 31,989-31,999.

Lissens, Gil, "Development of a Cloud, Snow and Cloud Shadow Mask for VEGETATION Imagery," in *Proc. Vegetation 2000: 2 Years of Operation to Prepare the Future Workshop*, G. Saint, Ed., Apr. 3-6, 2000, pp. 303-306.

Logar, A., et al., "A Hybrid Historam/Neural Network Classifier for Creating Global Cloud Masks," International Journal of Remote Sensing, 1997, vol. 18, No. 4, pp. 847-869.

Logar, A. M., et al., The ASTER Polar Cloud Mask,: IEEE Transactions of Geoscience and Remote Sensing, Jul. 1998, vol. 36, No. 4, pp. 1302-1312.

Milton, E. J., et al., "Cloud Shadow Suppression Using a Feature Space Approach to the Identification of Virtual Endmembers," Proceedings of 25th Annual Conference and Exhibition of the Remote Sensing Society, Cardiff, UK (1999).

Rossow, W. B., et al., "Global, Seasonal Cloud Variations from Satellite Radiance Measurements. Part I: Sensitivity of Analysis," Journal of Climate, May 1989, vol. 2, pp. 419-460.

Rossow, W. B., et al., "ISCCP Cloud Algorithm Intercomparison," Journal of Climate and Applied Meteorology, Sep. 1985, vol. 24, No. 9, pp. 877-903.

Rossow, W. B., "Measuring Cloud Properties from Space: A Review," Journal of Climate, Mar. 1989, vol. 2, pp. 201-215.

Sèze, G., et al., "Cloud Cover Observed Simultaneously from POLDER and METEOSAT," Physics and Chemistry of the Earth Part B: Hydrology, Oceans and Atmosphere, 1999, vol. 24, No. 8, pp. 921-926.

Simpson, J. J., et al., "A Procedure for the Detection and Removal of Cloud Shadow from AVHRR Data Over Land," IEEE Transactions on Geoscience and Remote Sensing, vol. 36, No. 3, pp. 880-897, May 1998.

Simpson, J. J., et al., "Cloud Shadow Detection Under Arbitrary Viewing and Illumination Conditions," IEE Transactions on Geoscience and Remote Sensing, Mar. 2000, vol. 38, No. 2, pp. 972-976.

Varlyguin, D. L., et al., Advances in Land Cover Classification for Applications Research: A Case Study from The Mid-Atlantic RESAC. Available at www.geog.umd.edu/resac and on ASPRS-2001 CD-ROM in American Society for Photogrammetry and Remote Sensing (ASPRS) Conference Proceedings, Washington DC (2001).

Vermote, E. F., et al., "A SeaWiFS Global Monthly Coarse-Resolution Reflectance Dataset," International Journal of Remote Sensing, 2001, vol. 22, No. 6, pp. 1151-1158.

Wang, B., et al., "Automated Detection and Removal of Clouds and their Shadows from Landsat TM Images," IEICE Trans., Inf. & Syst., vol. E82-D, No. 2, Feb. 1999.

* cited by examiner

SUB-VISIBLE CLOUD COVER ASSESSMENT: VNIR-SWIR

RELATED CASE

This application constitutes a continuation-in-part of the co-pending, commonly-owned U.S. patent application No. 10/720,290 entitled "CLOUD COVER ASSESSMENT: VNIR-SWIR," filed on Nov. 24, 2003, which is incorporated by reference.

FIELD OF THE INVENTION

This invention relates generally to image processing and, more specifically, to detection of cloud cover in high-altitude and/or orbital overhead imaging data.

BACKGROUND OF THE INVENTION

Overhead imaging studies of a surface below may be hampered by the presence of cloud formations. Understandably, thick clouds between an observation point and the area of interest under observation can conceal objects or features in the area of interest. Potentially worse in some cases is the presence of thinner cloud formations that do not entirely occlude the surface, but may reduce the contrast of surface features and change the derived surface spectral reflectance signature with resulting impact on information products such as spectral vegetation indices. Presence of thin cloud formations, such as cirrus clouds, can skew the analysis of such surface features by causing researchers to confuse presence of cloud features for features or changes in the surface region of study. For example, FIG. 1A shows a representative image 100 of a surface area under study. Merely looking at the image, it may be difficult to determine which aspects of the image are surface features 110 and which aspects are cloud features 120. Further, even though not visible to the naked eye observing an image, or to the eye of a person examining such an image, even sub-visible cloud formations can significantly degrade quantitative spectral analyses of an area being imaged.

Because the presence of cloud formations can interfere with the accuracy of overhead imaging studies, methodologies have been developed to detect the presence of cloud formations so that accuracy of surface studies will not be undermined by undetected cloud patterns. One approach is to use "clear-sky" spectral or reflectance maps of the areas of interest to detect the presence of clouds. By comparing the clear-sky maps with current imaging data, large-area spectral or reflectance changes may signal the presence of cloud cover. This approach involves successfully collecting, verified clear-sky imaging data of the area of interest. The clear-sky maps typically are created using thermal infra-red measurements to determine the presence of cloud formations. Most cloud formations, including high altitude such as cirrus clouds made up of ice crystals present a distinct, differentiable thermal signature. If thermal data indicates the presence of cirrus or other clouds in an area of study, it will be understood which portions of the image data are affected by the presence of clouds. Thus, analysis of the area of interest will not be distorted by the presence of undetected cloud formations.

FIG. 1B shows a "cloud mask" 150 derived using conventional techniques to show the cloud features 120 in the original image 100 of FIG. 1A. Absent the cloud mask 150, it can be appreciated that it might have been easy to confuse edges of cloud patterns 120 with surface features 110.

Unfortunately, as is readily appreciated, collection of thermal-infra red data requires equipment capable of gathering thermal-infrared data. In the realm of orbital satellites, integrating such equipment into the satellite increases cost. Additional telemetry involved in making use of such data also is resource-intensive and costly.

Even where such clear-sky data are available, continual accurate analytical comparison of archival clear-sky data with currently-captured imaging data is needed to ensure that the captured data represents suitably accurate, cloud-free images. Determination of whether the imaging data is suitably cloud-free is a significant concern. If it is not accurately determined whether captured images are suitably cloud-free, it may be necessary to arrange for the areas of interest to be re-imaged. Analysts who desire to use images from an image archive need to be assured that the image data is sufficiently cloud-free to be worthy of acquisition and use in their research. In addition, before quantitative analysis tools are applied to analyze the imaging data, the imaging data must be determined to be suitably cloud-free to ensure that the resulting quantitative analyses will be correct. Alternatively, algorithms may be applied to correct for thin cirrus cloud effects over portions of images affected only (no visible lower cloud) by thin cirrus cloud of reflectance below some arbitrary threshold.

Thus, there is an unmet need in the art for a method for determining presence of clouds and sub-visible clouds in aerial imaging data not involving use of special thermal infrared sensing equipment or the data collected by such equipment.

SUMMARY OF THE INVENTION

Embodiments of the present invention are useful in determining the presence of sub-visible clouds without involving thermal infrared detecting equipment. Embodiments of the present invention use spectral and spatial tests applied to pixel-level spectral measurements to determine the presence of cloud formations. The tests are computationally simple and, thus, do not impose an unreasonable operational computing workload. A sequence of such tests may be successively applied to the pixel-level spectral measurements to classify the pixel as indicating presence or absence of a cloud. Embodiments of the present invention can be used with various forms of visible cloud assessment to detect presence of sub-visible cirrus cloud formations.

More particularly, embodiments of the present invention provide methods, computer-readable media, and systems for determining whether a data point indicates a presence of a sub-visible cloud using visible, near-infrared, and short wavelength infrared data. A data point is selected from an imaging study of an area potentially covered by at least one of visible clouds and sub-visible clouds. A determination is made of whether the data point indicates presence of a sub-visible cloud. The determination is made by first excluding presence of visible cloud, and then comparing a cirrus-band reflectance of the data point with a sub-visible cirrus-band reflectance threshold. The data point is classified as a sub-visible cloud point if the cirrus-band reflectance of the data point exceeds the sub-visible cirrus band reflectance threshold.

Embodiments of the present invention can be combined with visible cloud detection systems and methods, advantageously preventing otherwise undetected sub-visible clouds from corrupting data gathered in an imaging study. Embodiments of the present invention can be combined with systems and methods for detecting visible clouds using visible, near-infrared, and short wavelength infrared data. Embodiments of the present invention also can be combined with systems and methods for detecting visible clouds using thermal imaging.

BRIEF DESCRIPTION OF THE DRAWINGS

The preferred and alternative embodiments of the present invention are described in detail below with reference to the following drawings.

DETAILED DESCRIPTION OF THE INVENTION

The invention relates generally to image processing and, more specifically, to detection of sub-visible cloud cover in high-altitude and/or orbital overhead imaging data. Many specific details of certain embodiments of the invention are set forth in the following description and in FIGS. 1–9 to provide a thorough understanding of such embodiments. One skilled in the art, however, will understand that the present invention may have additional embodiments, or that the present invention may be practiced without several of the details described in the following description.

Embodiments of the present invention can be used to determine the presence of sub-visible clouds in imaging data. Embodiments of the present invention can detect sub-visible clouds with spectral and spatial tests applied to pixel-level spectral measurements to determine the presence of sub-visible clouds without the use of thermal imaging data. Sub-visible cloud detection using embodiments of the present invention can be combined with other processes to detect presence of visible clouds, whether or not those processes employ thermal imaging.

By way of overview, embodiments of the present invention provide methods, computer-readable media, and systems for determining whether a data point indicates a presence of a sub-visible cloud using visible, near-infrared, and short wavelength infrared data. A data point is selected from an imaging study of an area potentially covered by at least one of visible clouds and sub-visible clouds. A determination is made of whether the data point indicates presence of a sub-visible cloud. The determination is made by first excluding presence of visible cloud, and then comparing a cirrus-band reflectance of the data point with a sub-visible cirrus-band reflectance threshold. The data point is classified as a sub-visible cloud point if the cirrus-band reflectance of the data point exceeds the sub-visible cirrus band reflectance threshold.

Studying images, empirically it can be determined for each of these data points whether the data point signifies a cloud point or a non-cloud point. It will be appreciated that, in accordance with embodiments of the present invention, a number of quantities can be calculated for each data point using data extractable from visible, near-infrared, and short-wavelength infrared data. By studying these calculated quantities, threshold values are determinable by which the calculated quantities suitably are used to automatically determine whether a data point represents a cloud point or a non-cloud point. It will also be appreciated that, although embodiments of the present invention may analyze data to determine a presence of both visible clouds and sub-visible cloud layers, a presently preferred embodiment of the present invention is tailored to classifying data points based on whether the data points indicate the presence of visible clouds.

Figure 1A:
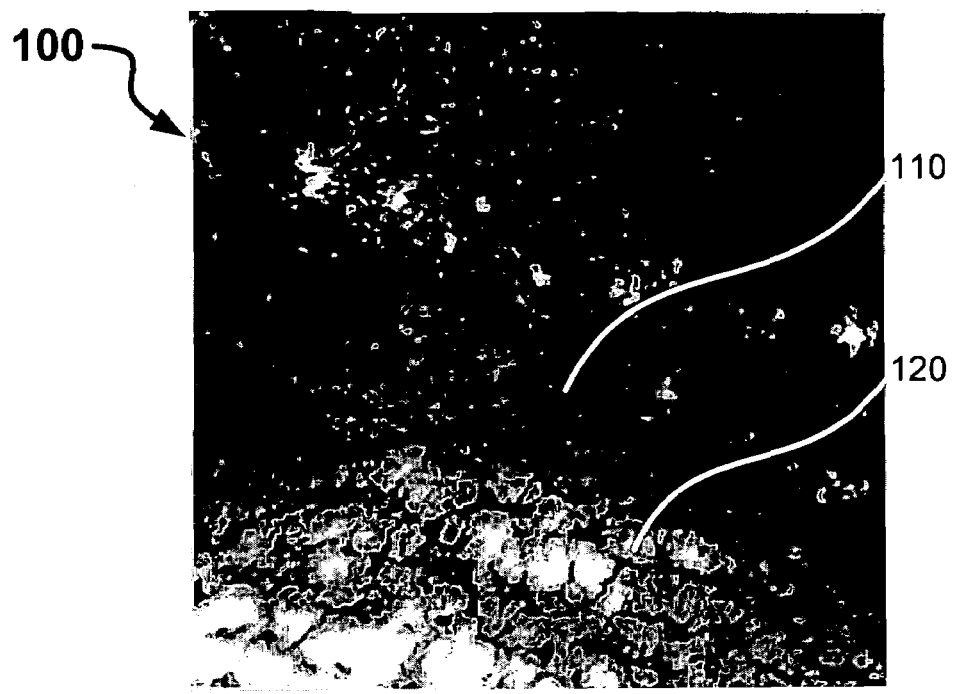
FIG. 1A is a conventional aerial image of an exemplary region of interest in accordance with the prior art.
Figure 1B:
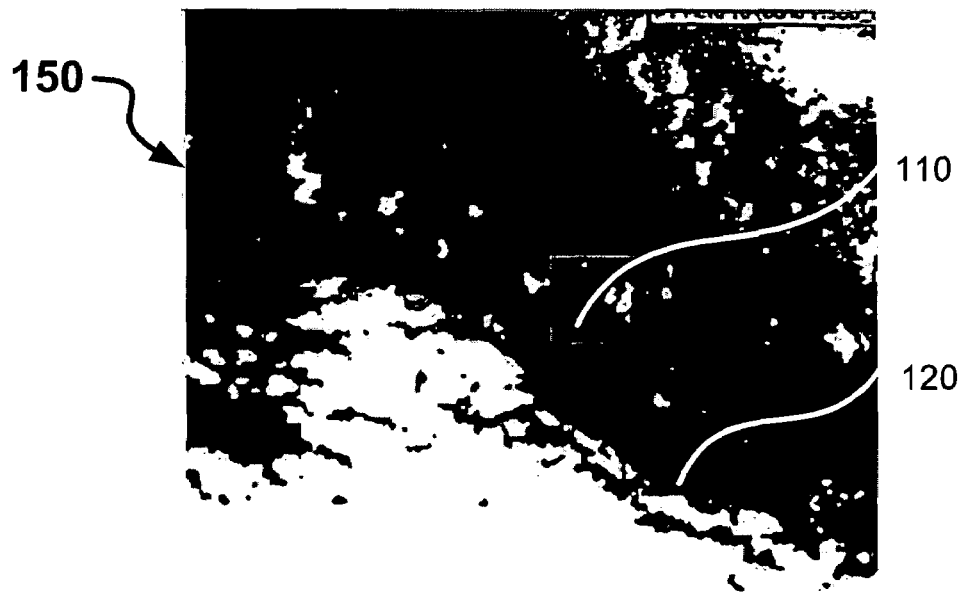
FIG. 1B is a conventional cloud mask derived from conventional techniques to indicate the presence of clouds in the image of the exemplary region of interest in accordance with the prior art.
Figure 2:
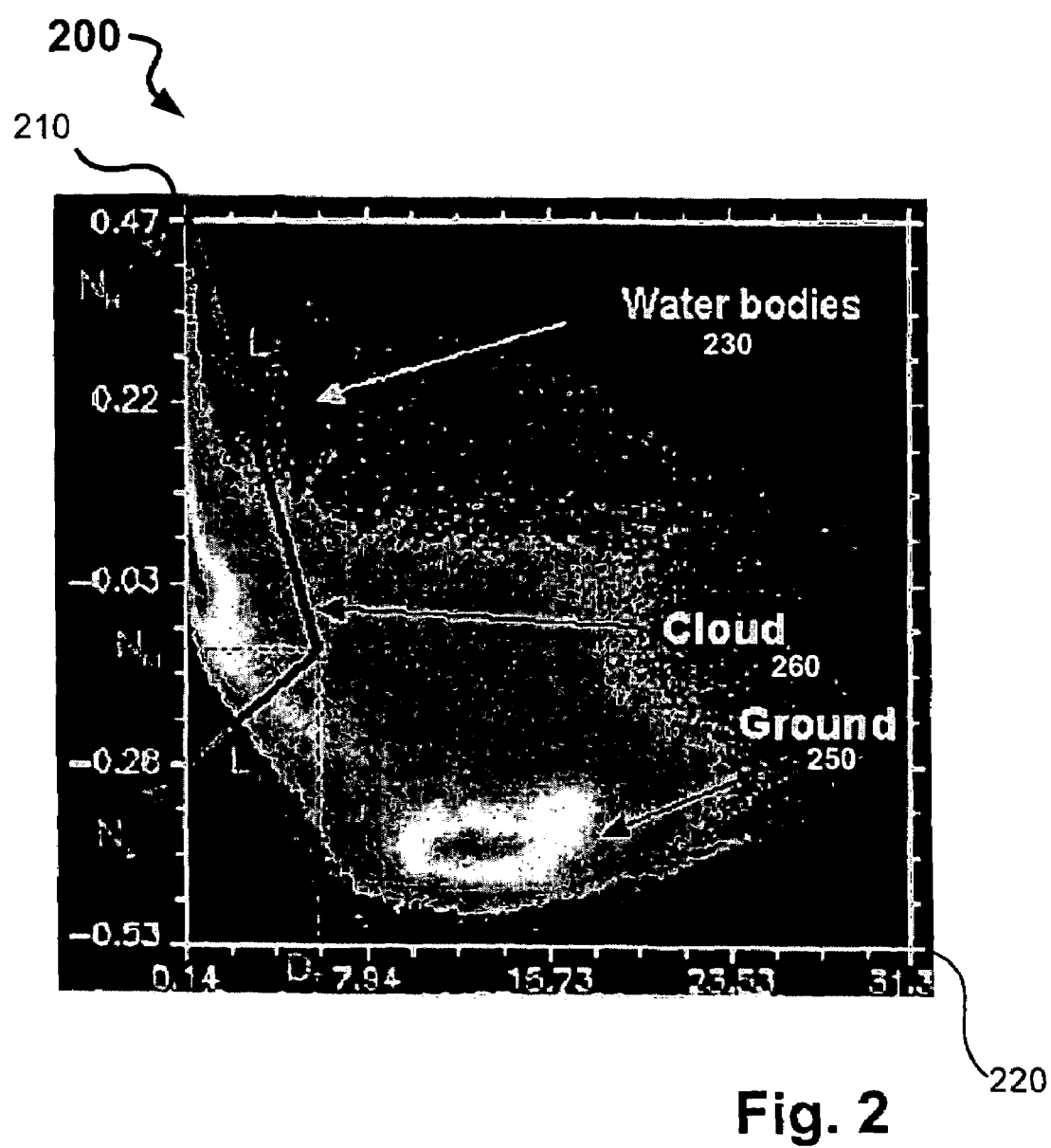
FIG. 2 is a graph plotting NDSI values versus D values and illustrating points where clouds are present.

FIG. 2 shows an exemplary graph 200 of such calculated quantities. Examining such a graph or other data representation in conjunction with associated cloud masks and RGB image, it can be determined what data points should be classified as cloud points and which should be classified as non-cloud points. More specifically, the graph shows normalized difference snow index, NDSI, plotted on a vertical axis 210 against values of a D variable on the horizontal axis 220. In one embodiment, NDSI is determined by equation (1):

$$NDSI = (\rho_{Green} - \rho_{SWIR1})/(\rho_{Green} + \rho_{SWIR1}) \quad (1)$$

The reflectance values, $\rho_{Green}$ and $\rho_{SWIR1}$, represent reflectance in the selected wavelength range, such as the green wavelengths, the short-wave infrared wavelength, respectively. The D variable, in turn, is determined from a normalized difference vegetation index, NDVI, respectively determined from equations (2) and (3):

$$D = |NDVI|^{0.6}/(\rho_{Red})^2 \quad (2)$$

$$NDVI = (\rho_{NIR} - \rho_{Red})/(\rho_{NIR} + \rho_{Red}) \quad (3)$$

The reflectance values, $\rho_{Red}$ and $\rho_{NIR}$, represent reflectance in the selected wavelength range, such as the red wavelengths, the near-infrared wavelengths, respectively.

The graph 200 shows values of NDSI versus D for data points that have been empirically identified by manual, visual inspection of an area of interest as representing bodies of water 230, shadows 240, ground 250, and clouds 260. Thus, because the data used in deriving NDSI, D, and NDVI is derivable from visible/near-infrared and short-wavelength infrared data, data points representing cloud points and non-cloud points can be identified without separate thermal infrared data.

A comparable analysis is achievable using different formulations of D. For example, in analyzing data collected by the Multiangle Imaging SpectroRadiometer (MISR) sensor used by NASA, D is calculated by raising NDVI to different exponential values depending on a type of ground cover expected to be present in the surface being imaged. Although the MISR D use is more complex because of its landcover-type-dependent NDVI exponent and large, statistically derived, D-threshold database, MISR D values also can be used with embodiments of the present invention to achieve satisfactory results.

Embodiments of the present invention can employ a number of such quantities to classify data points as cloud points or non-cloud points. Selection, ordering, calculation, and comparison of such quantities can be made in order to balance computational burdens and desired classification precision. For example, in two exemplary embodiments described below, a first comparison involves reflectance in the cirrus-band wavelengths, $\rho_{CI}$, with a threshold value which provides a ready, reliable first step in classifying data points as either cloud points or non-cloud points. In contrast with NDSI or D, $\rho_{CI}$ can be compared to a threshold value without additional computation, thus making a comparison of $\rho_{CI}$ as a first step can reduce computational burdens. It will also be appreciated that the steps can be ordered to evaluate potentially more reliable classifiers first, or the steps can be ordered to provide a logical AND or OR construct to provide for reliable classification of the data points.

Depending upon the computational resources available, it will be appreciated that analysis of data points can occur in real-time, while analysis of classification precision vs. computing load may occur in non-real-time. If non-real-time analyses indicate that greater precision can be achieved, to better meet user needs within available computing resources, by adjusting thresholds or adding additional cited tests to the real-time test hierarchy for specific background landcover types, locations, or times of year, those revisions can be made for future real-time processing.

Figure 3:
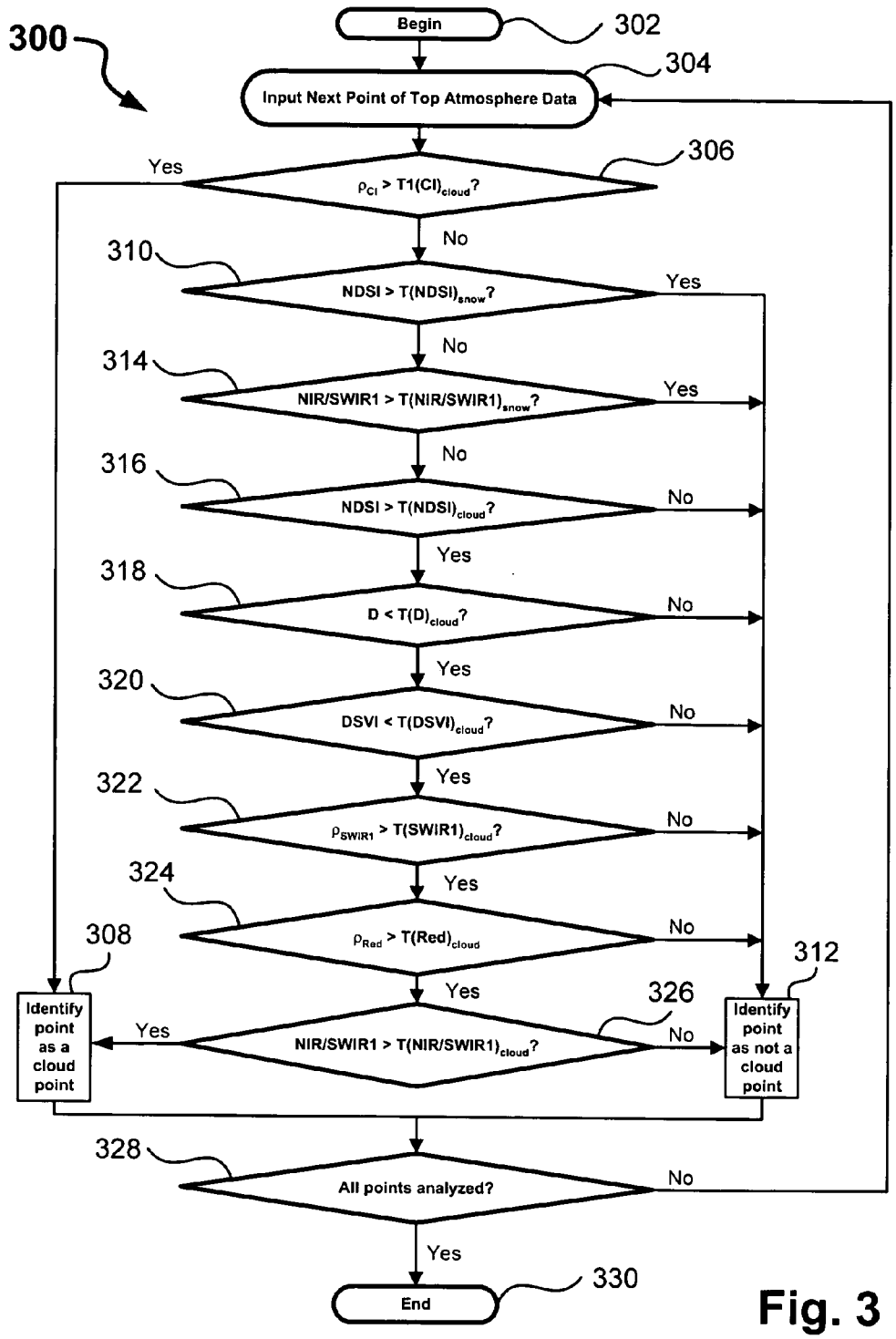
FIG. 3 is a flowchart of a routine according to an embodiment of the present invention for determining presence of cloud formations.

FIG. 3 shows a first embodiment of a routine 300 for classifying data points as cloud points or non-cloud points. The routine 300 begins at a block 302, and a next point of top of atmosphere, visible, near-infrared, and short-wavelength infrared data is submitted for processing at a block 304. At a block 306, a comparison of the $\rho_{CI}$ to a cirrus-band threshold cloud value is made. If $\rho_{CI}$ exceeds the threshold value, the data point is classified as a cloud point at a block 308. If not, the routine 300 proceeds to a next block to make a further comparison of whether the data point represents a cloud point or a non-cloud point.

In one particular embodiment, the $\rho_{CI}$ comparison at the block 306 is made at a wavelength of 1.88 µm. At this wavelength, the reflectance has been determined to be more reliable than at slightly lower wavelengths. Of course, in alternate embodiments, $\rho_{CI}$ may be tested at wavelengths other than 1.88 µm, such as at 1.38 µm or other cirrus bands.

If the comparison of $\rho_{CI}$ at the block 306 to make an initial determination of whether the data point was a cloud point did not result in the data point being classified as a cloud point at the block 308, additional comparisons can be made to further differentiate whether the data point is a cloud point or a non-cloud point. The comparisons and number of comparisons selected suitably are chosen to balance between computational simplicity and classification precision. Generally, as a greater number of comparisons are performed, greater precision is obtained. Nonetheless, selecting a fewer number of comparisons may result in a desirable degree of accuracy with fewer comparisons and/or calculations being made.

More specifically, if the comparison of the data point at the block 306 does not result in the data point being identified as a cloud point at the block 308, at a block 310 the NDSI is compared to an NDSI snow threshold value. This comparison may eliminate data points showing snow. If the data point NDSI is greater than the NDSI snow threshold value, the data point is a snow point. Again, the NDSI threshold value may be empirically determined using other information from which data points have previously been classified as cloud points or non-cloud points. If at the block 310 the NDSI exceeds the NDSI snow threshold value, the data point is classified as a non-cloud point at the block 312.

It will be appreciated how threshold values like the NDSI snow threshold value compared at the block 310 can affect classification precision. If, for example, the NDSI snow threshold is lowered, more data points may be classified as non-cloud ground points. If analysis reveals that this revision results in a net improvement in classification accuracy, application of further comparisons in the routine 300 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of landcover, location and season will incorporate a predetermined classification accuracy into embodiments of the present invention.

If the comparison of the data point at the block 310 does not result in the data point being identified as a non-cloud point at the block 312, then at a block 314, a comparison of a ratio of the near infrared data to the short-wavelength infrared data, NIR/SWIR1, to a NIR/SWIR1 snow threshold value is made to potentially eliminate data points showing snow. If the NIR/SWIR1 value exceeds the NIR/SWIR1 snow threshold value, the data point is classified as a non-cloud point at the block 312.

If the comparison of the data point at the block 314 does not result in the data point being identified as a non-cloud point at the block 312, then at a block 316 a comparison of a ratio of the NDSI value to an NDSI cloud threshold value is made to potentially eliminate data points showing bright ground. If the NDSI value is less than the NDSI cloud threshold value, the data point is classified as a non-cloud point at the block 312.

If the comparison of the data point at the block 316 does not result in the data point being identified as a non-cloud point at the block 312, at a block 318 a comparison of the D variable is made with a D variable cloud threshold to potentially eliminate data points showing vegetation. If the D variable is greater than the D variable cloud threshold, the data point is classified as a non-cloud point at the block 312.

If the comparison of the data point at the block 318 does not result in the data point being identified as a non-cloud point at the block 312, then at a block 320 a comparison of a D spatial variability index, DSVI, is made with a DSVI cloud threshold to potentially eliminate data points showing non-smooth features. In one particular embodiment, the D spatial variability index may be given by:

$$DSVI = |D_m - D_c| \qquad (4)$$

$D_m$ is mean of D values for at least a three-by-three matrix of data points surrounding the data point and $D_c$ is a central pixel in the three-by-three matrix of data points. If the DSVI is greater than the DSVI cloud threshold value, the data point is classified as a non-cloud point at the block 312.

It will be appreciated that calculation of the DSVI is a more computationally intensive step than other steps previously undertaken. The DSVI is derived from a plurality of D values which, in turn, are calculated from reflectance data of the data point. It will be appreciated that this step is not a first step in the routine 300 allowing for the possibility of faster, less-intensive methods associated with the foregoing blocks allowing for the data point to be classified as a cloud point 308 or a non-cloud point at the block 312. On the other hand, should additional computing power be available, the $D_m$ portion of DSVI could be computed for a larger matrix of points such as a mean of a five-by-five or larger matrix, centered on $D_c$. Use of a larger matrix can increase the accuracy of the DSVI comparison by providing a statistically better $D_m$ portion. If the comparison of the data point at the block 320 does not result in the data point being identified as a non-cloud point at the block 312, then at a block 322 a comparison of the short-wavelength reflectance, $\rho_{SWIR1}$, is made to a short-wavelength reflectance cloud threshold to potentially eliminate data points showing dark features. If $\rho_{SWIR1}$ is less than the short-wavelength reflectance cloud threshold, the data point is classified as a non-cloud point at the block 312.

If the comparison of the data point at the block 322 does not result in the data point being identified as a non-cloud point at the block 312, then at a block 324 a comparison of $\rho_{Red}$ to a red wavelength cloud threshold value is made to eliminate additional data points showing dark features. If $\rho_{Red}$ is less than the red wavelength cloud threshold value, the data point is classified as a non-cloud point at the block 312.

If the comparison of the data point at the block 324 does not result in the data point being identified as a non-cloud point at the block 312, then at a block 326, a comparison of a ratio of the NIR/SWIR1 to a NIR/SWIR1 cloud threshold value is made to potentially eliminate additional data points showing bright ground. If the NIR/SWIR1 value is less than the NIR/SWIR1 cloud threshold value the data point is classified as a non-cloud point at the block 312. On the other hand, if the NIR/SWIR1 value is greater than the NIR/SWIR1 cloud threshold value, the data point is classified as a cloud point at the block 308.

Once the data points have been classified as one of a cloud point at the block 308, or as a non-cloud point at the block 312, then at a block 328 it is determined if all data points of interest have been classified. If not, the routine 300 loops to the block 304 where the next data point is addressed. However, if it is determined at the block 328 that all the data points of interest have been analyzed, the routine 300 ends at the block 330.

As previously described, the routine 300 uses cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. For example, and not by way of limitation, Table 1 presented below lists representative threshold values that suitably may be used in the routine 300 for scenes and seasons of interest:

TABLE 1

| Scene | Season | D | $NDSI_{snow}$ | $NDSI_{cloud}$ | DSVI | $\rho_{SWIR1}$ | $NIR/SWIR1_{snow}$ | $NIR/SWIR1_{cloud}$ | $\rho_{Red}$ | $P_{Cloud}$ |
|---|---|---|---|---|---|---|---|---|---|---|
| Forest/ Closed Shrub | Summer or Tropical | 20 | N/A | −0.25 | 1 | 0.1 | N/A | 1 | 0.1 | 0.03 |
| Forest/ Closed Shrub | Spring or Fall without snow | 10 | N/A | −0.35 | 3.5 | 0.1 | N/A | 1 | 0.1 | 0.03 |
| Forest/ Closed Shrub | Fall, Spring or Winter (snow) | 2 | 0.55 | −0.3 | 0.2 | 0..2 | 4 | N/A | 0.1 | 0.03 |
| Grass or Crops (Mosaic) | Summer | 20 (40) | N/A | −0.3 | 1 | 0.1 | N/A | 1 | 0.1 | 0.03 |
| Grass or Crops (Mosaic) | Spring or Fall w/o snow | 10 | N/A | −0.35 | 1 | 0.1 | N/A | 0.9 | 0.1 | 0.03 |
|  | Fall, Spring or Winder w/snow | 2 | 0.55 | −0.35 | 0.2 | 0.2 | 4 | 1 | 0.2 | 0.03 |
| Snow and Ice | All | 2 | 0.55 | −0.3 | 0.2 | 0.2 | 4 | N/A | 0.1 | 0.03 |
| Barren or Sparse Open Shrub | (No Snow) | 4 | N/A | −0.25 | 1 | 0.1 | N/A | 0.8 | 0.2 | 0.03 |
| Savanna | (No Snow) | 10 | N/A | −0.35 | 1 | 0.1 | N/A | 0.8 | 0.2 | 0.03 |

It will be appreciated that thresholds can be derived from study of other scenes and terrains, such as wetlands or water-covered areas as well.

Various combinations of tests can be used to optimally balance desires for accuracy and computing efficiency. For example, accurate results are obtainable according to a subset of the routine 300 (FIG. 3) where comparisons at the decision blocks 306, 316, 318, 320, and 326 and at least one of the comparisons at the decision blocks 310, 314, and 322. Table 2, on a next page, shows a computed accuracy for tests and combinations of tests run on a number of data sets.

TABLE 2

| Scene# | MAS ID | Truth % | Cirrus % | | | Error = Measured − Truth | | | | |
|---|---|---|---|---|---|---|---|---|---|---|
| 1 | 97047_21 | 51.33 | 43.1735 | 1.8217 | 1.8217 | 4.3696 | 4.3696 | 1.1733 | 1.1733 | 4.1394 |
| 2 | 97050_09 | 26.75 | 18.6906 | −3.0505 | −3.0505 | −4.0335 | −4.0335 | −4.6833 | −4.6833 | −4.1657 |
| 3 | 96110_26 | 61.36 | 60.1988 | −1.1286 | −1.1286 | −0.7469 | −0.7470 | −1.1433 | −1.1433 | −0.8238 |
| 4 | 96114_10 | 55.95 | 54.3096 | −1.2736 | −1.2736 | −1.2696 | −1.2696 | −1.2736 | −1.2736 | −1.2696 |
| 5 | 95116_02 | 78.66 | 78.0950 | −0.1030 | −0.1030 | 0.6430 | 0.6402 | −0.1030 | −0.1030 | 0.3881 |
| 6 | 01100_01 | 34.05 | 16.9678 | −6.2901 | −6.3132 | −6.2899 | −6.3129 | −6.2901 | −6.3132 | −6.2899 |
| 7 | 01100_02 | 60.58 | 53.1903 | −7.2377 | −7.2378 | −7.2377 | −7.2378 | −7.2377 | −7.2378 | −7.2377 |
| 8 | 01100_03 | 33.17 | 30.2151 | 0.0958 | 0.0958 | 0.1899 | 0.1895 | 0.0958 | 0.0958 | 0.1899 |
| 9 | 01100_04 | 0.64 | 0.3803 | −0.0373 | −0.0373 | −0.0359 | −0.0363 | −0.0373 | −0.0373 | −0.0359 |
| 10 | 01100_06 | 9.17 | 0.0000 | −5.1183 | −5.1187 | −4.9469 | −4.9782 | −5.1183 | −5.1187 | −4.9469 |
| 11 | 01100_07 | 22.36 | 1.7270 | 1.0630 | 1.0607 | 1.9494 | 1.9105 | 1.0630 | 1.0607 | 1.9494 |
| 12 | 01100_08 | 95.09 | 94.6252 | −0.0941 | −0.0941 | −0.0924 | −0.0936 | −0.0941 | −0.0941 | −0.0924 |
| 13 | 01100_09 | 26.26 | 0.7833 | −6.2423 | −6.2423 | −5.7884 | −5.7930 | −6.2423 | −6.2423 | −5.7884 |
| 14 | 01100_10 | 17.97 | 0.2624 | −4.2455 | −4.2455 | −4.0007 | −4.0012 | −4.2455 | −4.2455 | −4.0007 |
| 15 | 01110_03 | 2.01 | 0.0000 | −0.8531 | −0.8532 | −0.8256 | −0.8333 | −0.8531 | −0.8532 | −0.8256 |
| 16 | 01110_04 | 51.42 | 26.9409 | −1.9426 | −1.9426 | −1.7426 | −1.7426 | −1.9426 | −1.9426 | −1.7426 |
| 17 | 01110_05 | 84.58 | 81.2260 | 3.2395 | 3.2395 | 3.2444 | 3.2415 | 3.2395 | 3.2395 | 3.2444 |
| 18 | 01110_08 | 40.21 | 29.2289 | −1.6000 | −1.6001 | −1.2898 | −1.5814 | −1.6000 | −1.6001 | −1.2898 |
| 19 | 01110_11 | 57.00 | 48.7074 | −8.1113 | −8.1113 | −7.7620 | −7.7821 | −8.1113 | −8.1113 | −7.7620 |
| 20 | 01110_12 | 30.91 | 24.0226 | −6.2068 | −6.2068 | −6.1620 | −6.1817 | −6.2068 | −6.2068 | −6.1620 |
| 21 | 01110_13 | 48.18 | 45.0783 | −2.4732 | −2.4732 | −2.4102 | −2.4473 | −2.4732 | −2.4732 | −2.4102 |
| 22 | 01110_14 | 34.98 | 31.1644 | −2.4859 | −2.4859 | −2.4699 | −2.4703 | −2.4859 | −2.4859 | −2.4699 |
| 23 | 01110_15 | 79.84 | 77.3877 | 0.7629 | 0.7627 | 0.9420 | 0.9417 | 0.7629 | 0.7627 | 0.9420 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.4181 | 2.4177 | 2.5489 | 2.5476 | 2.4181 | 2.4177 | 2.5489 |
| 26 | 01130_09 | 28.74 | 0.0002 | −0.4654 | −0.4654 | 0.4605 | 0.2763 | −0.4654 | −0.4654 | 0.4605 |
| 27 | 99030_01 | 52.68 | 23.1581 | −3.2878 | −3.2878 | −1.8294 | −1.8294 | −3.2878 | −3.2878 | −1.8294 |
| 28 | 95163_17 | 48.89 | 9.3589 | −1.2679 | −1.2679 | −0.5307 | −0.5307 | −1.2679 | −1.2679 | −0.5307 |
| 29 | 00176_05 | 50.89 | 0.0000 | 9.2824 | 4.9030 | 9.2826 | 4.9030 | 9.2824 | 4.9030 | 9.2826 |
| 30 | 00177_08 | 39.08 | 17.4549 | 2.2787 | −1.6414 | 2.2878 | −1.6414 | 2.2787 | −1.6414 | 2.2878 |
| | | | Test# 3 | 0 | 0 | 0 | 0 | 0 | 0 | 1 |
| | | | 4 | 0 | 0 | 1 | 1 | 1 | 1 | 0 |
| | | | 5 | 1 | 1 | 1 | 1 | 1 | 1 | 1 |
| | | | 6 | 1 | 1 | 1 | 1 | 1 | 1 | 1 |
| | | | 7 | 1 | 1 | 1 | 1 | 1 | 1 | 1 |
| | | | 8 | 1 | 1 | 0 | 0 | 1 | 1 | 0 |
| | | | 9 | 0 | 1 | 0 | 1 | 0 | 1 | 0 |
| | | | 10 | 1 | 1 | 1 | 1 | 1 | 1 | 1 |
| | | | #tests | 5 | 6 | 5 | 6 | 6 | 7 | 5 |
| | | | mean err | −1.4172 | −1.6947 | −1.1170 | −1.4162 | −1.4937 | −1.7713 | −1.1401 |

| Scene# | MAS ID | Truth % | Cirrus % | | | Error = Measured − Truth | | | | |
|---|---|---|---|---|---|---|---|---|---|---|
| 1 | 97047_21 | 51.33 | 43.1735 | 4.1394 | 1.2431 | 1.2431 | 3.8076 | 3.8076 | 1.1402 | 1.1402 |
| 2 | 97050_09 | 26.75 | 18.6906 | −4.1657 | −5.0715 | −5.0715 | −4.4495 | −4.4495 | −5.0809 | −5.0809 |
| 3 | 96110_26 | 61.36 | 60.1988 | −0.8238 | −1.1433 | −1.1433 | −0.8255 | −0.8255 | −1.1433 | −1.1433 |
| 4 | 96114_10 | 55.95 | 54.3096 | −1.2696 | −1.2736 | −1.2736 | −1.2696 | −1.2696 | −1.2736 | −1.2736 |
| 5 | 95116_02 | 78.66 | 78.0950 | 0.3876 | −0.1033 | −0.1033 | 0.3881 | 0.3876 | −0.1033 | −0.1033 |
| 6 | 01100_01 | 34.05 | 16.9678 | −6.3129 | −6.3132 | −6.2899 | −6.3129 | −6.2901 | −6.3132 | −6.2899 |
| 7 | 01100_02 | 60.58 | 53.1903 | −7.2378 | −7.2377 | −7.2378 | −7.2377 | −7.2378 | −7.2377 | −7.2378 |
| 8 | 01100_03 | 33.17 | 30.2151 | 0.1895 | 0.0958 | 0.0958 | 0.1899 | 0.1895 | 0.0958 | 0.0958 |
| 9 | 01100_04 | 0.64 | 0.3803 | −0.0363 | −0.0373 | −0.0373 | −0.0359 | −0.0363 | −0.0373 | −0.0373 |
| 10 | 01100_06 | 9.17 | 0.0000 | −4.9782 | −5.1183 | −5.1187 | −4.9469 | −4.9782 | −5.1183 | −5.1187 |
| 11 | 01100_07 | 22.36 | 1.7270 | 1.9105 | 1.0630 | 1.0607 | 1.9494 | 1.9105 | 1.0630 | 1.0607 |
| 12 | 01100_08 | 95.09 | 94.6252 | −0.0936 | −0.0941 | −0.0941 | −0.0924 | −0.0936 | −0.0941 | −0.0941 |
| 13 | 01100_09 | 26.26 | 0.7833 | −5.7930 | −6.2423 | −6.2423 | −5.7884 | −5.7930 | −6.2423 | −6.2423 |
| 14 | 01100_10 | 17.97 | 0.2624 | −4.0012 | −4.2455 | −4.2455 | −4.0007 | −4.0012 | −4.2455 | −4.2455 |
| 15 | 01110_03 | 2.01 | 0.0000 | −0.8333 | −0.8531 | −0.8532 | −0.8256 | −0.8333 | −0.8531 | −0.8532 |
| 16 | 01110_04 | 51.42 | 26.9409 | −1.7426 | −1.9426 | −1.9426 | −1.7426 | −1.7426 | −1.9426 | −1.9426 |
| 17 | 01110_05 | 84.58 | 81.2260 | 3.2415 | 3.2395 | 3.2395 | 3.2444 | 3.2415 | 3.2395 | 3.2395 |
| 18 | 01110_08 | 40.21 | 29.2289 | −1.5814 | −1.6000 | −1.6001 | −1.2898 | −1.5814 | −1.6000 | −1.6001 |
| 19 | 01110_11 | 57.00 | 48.7074 | −7.7821 | −8.1113 | −8.1113 | −7.7620 | −7.7821 | −8.1113 | −8.1113 |
| 20 | 01110_12 | 30.91 | 24.0226 | −6.1817 | −6.2068 | −6.2068 | −6.1620 | −6.1817 | −6.2068 | −6.2068 |
| 21 | 01110_13 | 48.18 | 45.0783 | −2.4473 | −2.4732 | −2.4732 | −2.4102 | −2.4473 | −2.4732 | −2.4732 |
| 22 | 01110_14 | 34.98 | 31.1644 | −2.4703 | −2.4859 | −2.4859 | −2.4699 | −2.4703 | −2.4859 | −2.4859 |
| 23 | 01110_15 | 79.84 | 77.3877 | 0.9417 | 0.7629 | 0.7627 | 0.9420 | 0.9417 | 0.7629 | 0.7627 |
| 24 | 01130_05 | 71.09 | 52.6079 | 0.0370 | 0.0370 | 0.0370 | 0.0370 | 0.0370 | 0.0370 | 0.0370 |
| 25 | 01130_07 | 62.95 | 48.5385 | 2.5476 | 2.4181 | 2.4177 | 2.5489 | 2.5476 | 2.4181 | 2.4177 |
| 26 | 01130_09 | 28.74 | 0.0002 | 0.2763 | −0.4654 | −0.4654 | 0.4605 | 0.2763 | −0.4654 | −0.4654 |
| 27 | 99030_01 | 52.68 | 23.1581 | −1.8294 | −3.2878 | −3.2878 | −1.8294 | −1.8294 | −3.2878 | −3.2878 |
| 28 | 95163_17 | 48.89 | 9.3589 | −0.5307 | −1.2679 | −1.2679 | −0.5307 | −0.5307 | −1.2679 | −1.2679 |
| 29 | 00176_05 | 50.89 | 0.0000 | 4.9030 | 9.2824 | 4.9030 | 9.2826 | 4.9030 | 9.2824 | 4.9030 |

TABLE 2-continued

| 30 | 00177_08 | 39.08 | 17.4549 | −1.6414 | 2.2787 | −1.6414 | 2.2878 | −1.6414 | 2.2787 | −1.6414 |
|----|----------|-------|---------|---------|--------|---------|--------|---------|--------|---------|
|    |          | Test# | 3       | 1       | 1      | 1       | 1      | 1       | 1      | 1       |
|    |          |       | 4       | 0       | 0      | 0       | 1      | 1       | 1      | 1       |
|    |          |       | 5       | 1       | 1      | 1       | 1      | 1       | 1      | 1       |
|    |          |       | 6       | 1       | 1      | 1       | 1      | 1       | 1      | 1       |
|    |          |       | 7       | 1       | 1      | 1       | 1      | 1       | 1      | 1       |
|    |          |       | 8       | 0       | 1      | 1       | 0      | 0       | 1      | 1       |
|    |          |       | 9       | 1       | 0      | 1       | 0      | 1       | 0      | 1       |
|    |          |       | 10      | 1       | 1      | 1       | 1      | 1       | 1      | 1       |
|    |          | #tests | 6      | 6       | 7      | 6       | 7      | 7       | 8      |         |
|    |          | mean err | −1.4393 | −1.5044 | −1.7819 | −1.1607 | −1.4599 | −1.5081 | −1.7856 | |

| Test# | Description |
|-------|-------------|
| 1 | Cirrus band TOA reflectance >0.03; Always included in cloud % |
| 2 | NDSI test for shadowed snow; Does not impact cloud %; Not included in this analysis |
| 3 | NDSI test to eliminate snow |
| 4 | NIR/SWIR1 test to eliminate snow |
| 5 | NDSI test to eliminate bright ground |
| 6 | D test to eliminate veg |
| 7 | DSVI test to eliminate non-smooth features |
| 8 | SWIR1 band TOA reflectance test to eliminate dark features |
| 9 | Red band TOA reflectance test to eliminate dark features |
| 10 | NIR/SWIR1 test to eliminate bright ground |

Figure 4:
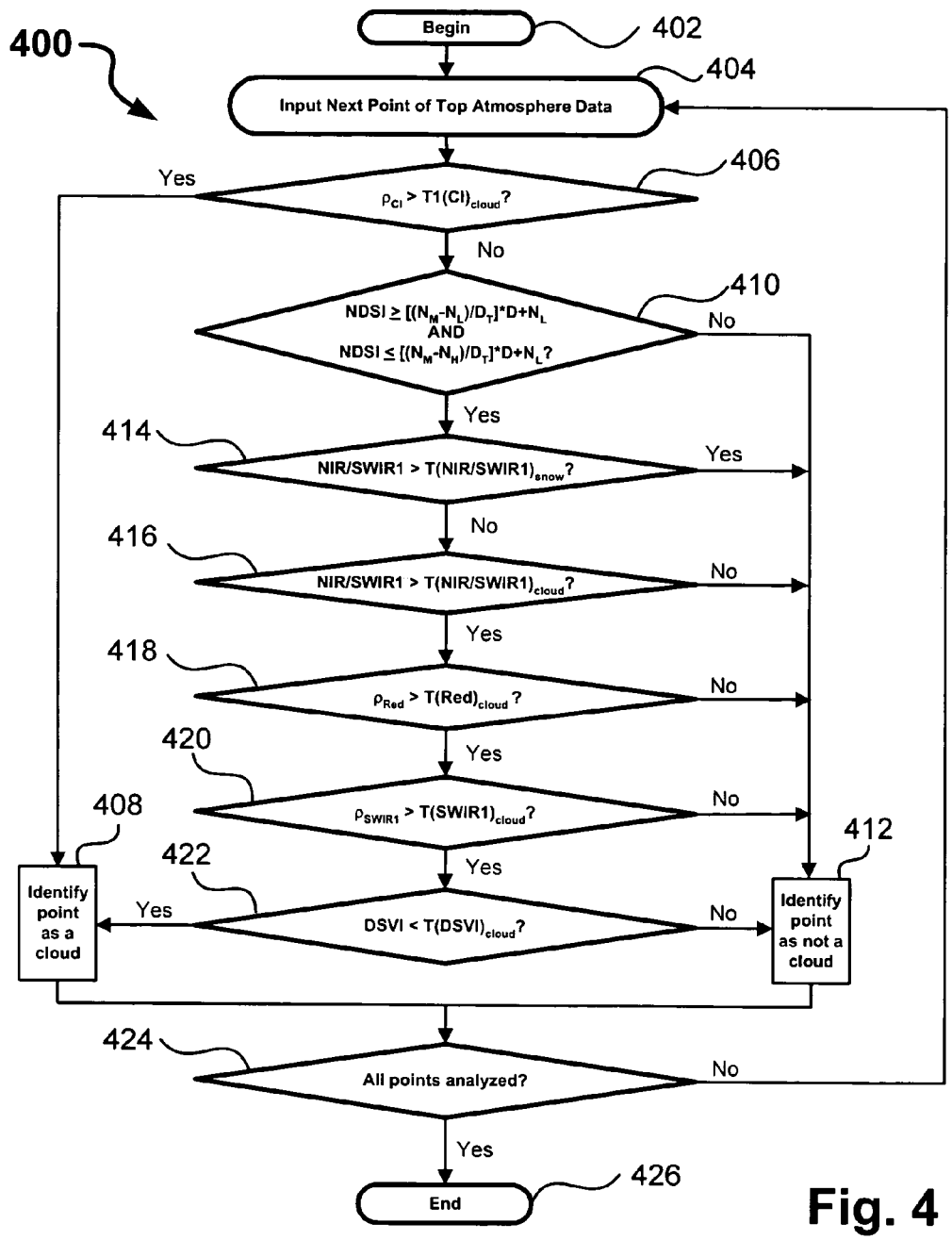
FIG. 4 is a flowchart of a routine according to another embodiment of the present invention for determining presence of cloud formations.

FIG. 4 shows a second embodiment of a routine 400 for classifying data points as cloud points or non-cloud points. The routine 400 begins at a block 402, and a next point of top of atmosphere visible, near-infrared, and short-wavelength infrared data is submitted for processing at a block 404. At a block 406, a comparison of the $\rho_{CI}$ to a cirrus-band threshold cloud value is made. If $\rho_{CI}$ exceeds the cloud threshold value, the data point is classified as a cloud point at a block 408. If not, the routine 400 proceeds to a next block to make a further comparison of whether the data point represents a cloud point or a non-cloud point.

If the comparison of the data point at the block 406 does not result in the data point being identified as a cloud point at the block 408, then at a block 410 the NDSI is compared to an NDSI minimum threshold value and an NDSI maximum threshold value. The NDSI thresholds are set according to empirical analysis of NDSI data such as that shown in FIG. 2. Unlike the routine shown in FIG. 3 which uses single-value cutoff thresholds, at the block 410 the threshold defines an area of the graph 200 (FIG. 2) as opposed to an intercept. More specifically, the comparison of NDSI at the block 410 is:

$$NDSI > [(N_M - N_L)/D_T]*D + N_L$$

AND $$NDSI < [(N_M - N_H)/D_T]*D + N_L$$

If either comparison is false, the data point is classified as a non-cloud point at a block 412. Values for these threshold calculation numbers are included in Table 2, below.

If the comparison of the data point at the block 410 does not result in the data point being identified as a non-cloud point at the block 412, at a block 414 a comparison of a ratio of NIR/SWIR1 to a NIR/SWIR1 snow threshold value is made. If the NIR/SWIR1 value is greater than the NIR/SWIR1 snow threshold value, the data point is classified as a non-cloud point at the block 412.

If the comparison of the data point at the block 414 does not result in the data point being identified as a non-cloud point at the block 412, then at a block 416 a comparison of a ratio of the NIR/SWIR1 value to an NIR/SWIR1 cloud threshold value is made. If the NIR/SWIR1 value is less than the NIR/SWIR1 cloud threshold value, the data point is classified as a non-cloud point at the block 412.

If the comparison of the data point at the block 416 does not result in the data point being identified as a non-cloud point at the block 412, then at a block 418 a comparison of $\rho_{Red}$ to a red wavelength cloud threshold value is made. If $\rho_{Red}$ is less than the red wavelength cloud threshold value, the data point is classified as a non-cloud point at the block 412.

If the comparison of the data point at the block 418 does not result in the data point being identified as a non-cloud point at the block 412, then at a block 420 a comparison of the short-wavelength reflectance, $\rho_{SWIR1}$, is made to a short-wavelength reflectance cloud threshold. If $\rho_{SWIR1}$ is less than the short-wavelength reflectance cloud threshold, the data point is classified as a non-cloud point at the block 412.

If the comparison of the data point at the block 420 does not result in the data point being identified as a non-cloud point at the block 412, then at a block 422 a comparison of the DSVI is made with a DSVI cloud threshold. If the DSVI exceeds the DSVI cloud threshold, the data point is classified as a non-cloud point at the block 412. On the other hand, if the DSVI is less than the DSVI cloud threshold, the data point is classified as a cloud point at the block 408.

Once the data points have been classified as one of a cloud point at the block 408 or as a non-cloud point at the block 412, then at a block 424 it is determined if all data points of interest have been classified. If not, the routine 400 loops to the block 404 where the next data point is addressed. However, if it is determined at the block 424 that all the data points of interest have been analyzed, the routine 400 ends at the block 426.

As previously described, the routine 400 uses threshold calculations empirically derived from manual or other studies of overhead imaging data. The threshold values may vary depending on the nature of the area of interest and the season during which the imaging data is captured. For example, threshold values for forests or closed shrub areas will vary between summer/tropical seasons and snowy seasons, just as the threshold values will vary between permanent wetlands and permanently snow-covered areas. Again, for example and not by way of limitation, Table 3 below lists representative threshold values that suitably may be used in the routine 400:

TABLE 3

| Scene | T (CI)$_{cloud}$ | N$_L$ | N$_M$ | N$_H$ | D$_T$ | T (NIR/SWIR1)$_{snow}$ | T (NIR/SWIR1)$_{cloud}$ | ρ$_{Red}$ | SWIR1 | DSVI |
|---|---|---|---|---|---|---|---|---|---|---|
| Forest - summer mid-latitude | 0.03 | −0.2 | −0.15 | 1 | 20 | N/A | 0.8 | 0.1 | 0.1 | 1 |
| Forest - tropical | 0.03 | −0.5 | −0.3 | 1 | 20 | N/A | 0.8 | 0.1 | 0.1 | 1 |
| Crops or Mosaic - Summer | 0.03 | −0.3 | −0.2 | 1 | 40 | N/A | 0.8 | 0.1 | 0.1 | 1 |
| Grass - Summer | 0.03 | −0.3 | −0.2 | 1 | 20 | N/A | 0.8 | 0.1 | 0.1 | 1 |
| Crops or Mosaic - Spring | 0.03 | −0.3 | −0.2 | 1 | 10 | N/A | 0.8 | 0.1 | 0.1 | 1 |
| Crops or Mosaic - Snow | 0.03 | −0.5 | −0.3 | 0.6 | 5 | 4 | 0.8 | 0.1 | 0.1 | 1 |
| Barren | 0.03 | −0.3 | −0.2 | 1 | 3 | N/A | 0.8 | 0.1 | 0.1 | 1 |
| Savanna or Open Shrub | 0.03 | −0.3 | −0.2 | 1 | 10 | N/A | 0.8 | 0.1 | 0.1 | 1 |

It will be appreciated that the routine 400 (FIG. 4) simplifies the selection of threshold values.

Figure 5:
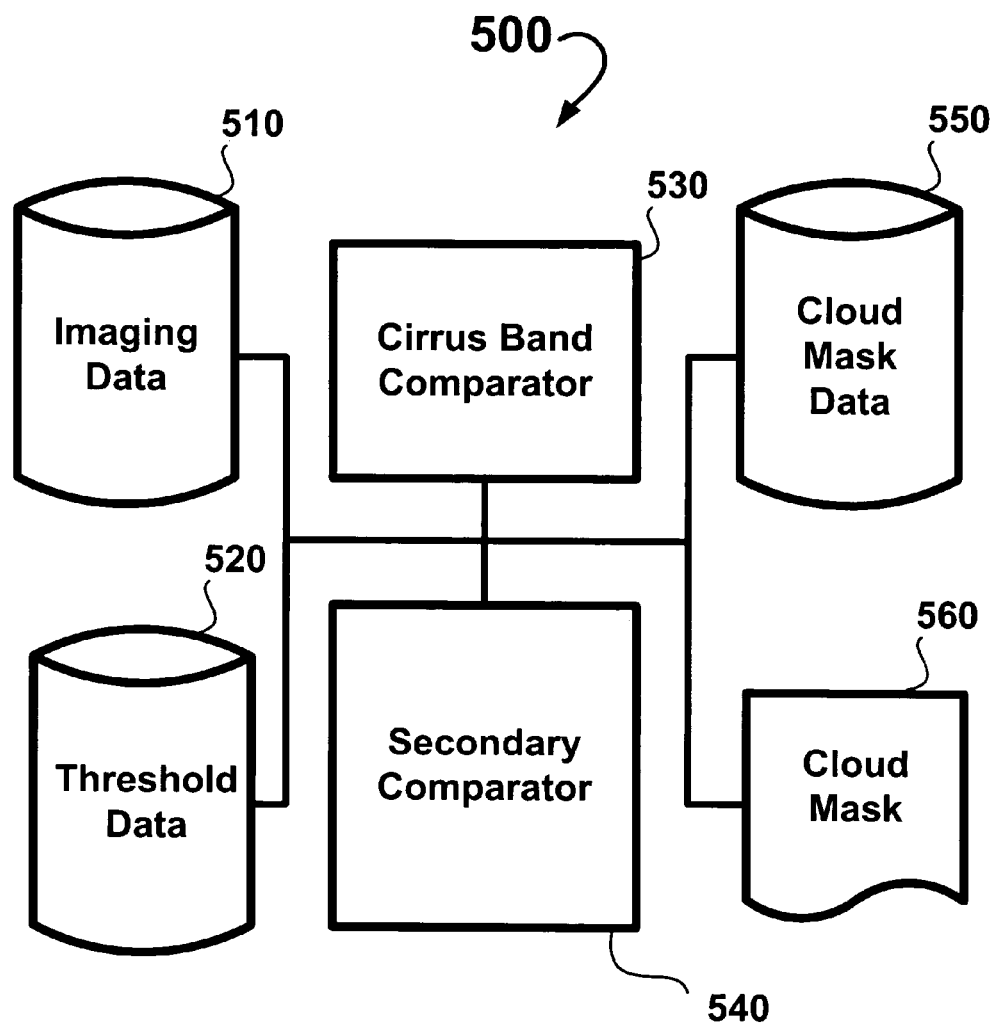
FIG. 5 is a block diagram of a system according to an embodiment of the present invention.

FIG. 5 shows a system 500 according to an embodiment of the present invention. Imaging data 510, including imaging data from at least one data point, is received. Threshold data 520, such as the parameters previously described in connection with FIGS. 3 and 4 and Tables 1 and 2, is supplied to the system for comparison. A cirrus band comparator 530 makes a first comparison of the data point with a cirrus band threshold. As previously described, if the cirrus band reflectance of the data point exceeds the cirrus band threshold, the data point is classified as a cloud point in cloud mask data 550 and/or a cloud mask 560. On the other hand, if use of the cirrus band comparator 530 does not result in classification of the data point, a secondary comparator 540 is applied to classify the data point. Using routines previously described in connection with FIGS. 3 and 4, the secondary comparator 540 uses additional cloud indicators and cloud indicator thresholds to classify the data points. When the secondary comparator 540 classifies the data point as either a cloud point or a non-cloud point, the data point is appropriately classified in the cloud mask data 550 and/or the cloud mask 560 in accordance with the predetermined classification precision determined by the threshold levels established for the comparisons being made. The system 500 suitably is applied to all data points in the imaging data 510 to generate cloud mask data 550 and/or a cloud mask 560 for the imaging data 510.

It will be appreciated that, in one embodiment of the invention, the determination as to acceptability of accuracy provided by a given set of tests and thresholds would be determined by processing a representative set of imagery off-line, and by evaluating resultant cloud masks in comparison with "truth" cloud masks produced by expert analysis. Adjustments would be iterated and evaluated for optimization, and production test hierarchy and thresholds would then be adjusted for subsequent on-line production runs.

As will be described below, embodiments of the present invention can be combined with embodiments of the invention previously submitted for detection of visible clouds. As previously described, presence of visible clouds can de discerned using visible, near-infrared, and short wavelength infrared data. An aspect of embodiments of the previously-described invention involved comparing measured reflectance in a cirrus band with thresholds indicating presence or absence of visible clouds. Embodiments of the invention use cirrus band reflectance to discern presence or absence of sub-visible cirrus clouds as well.

Figure 6:
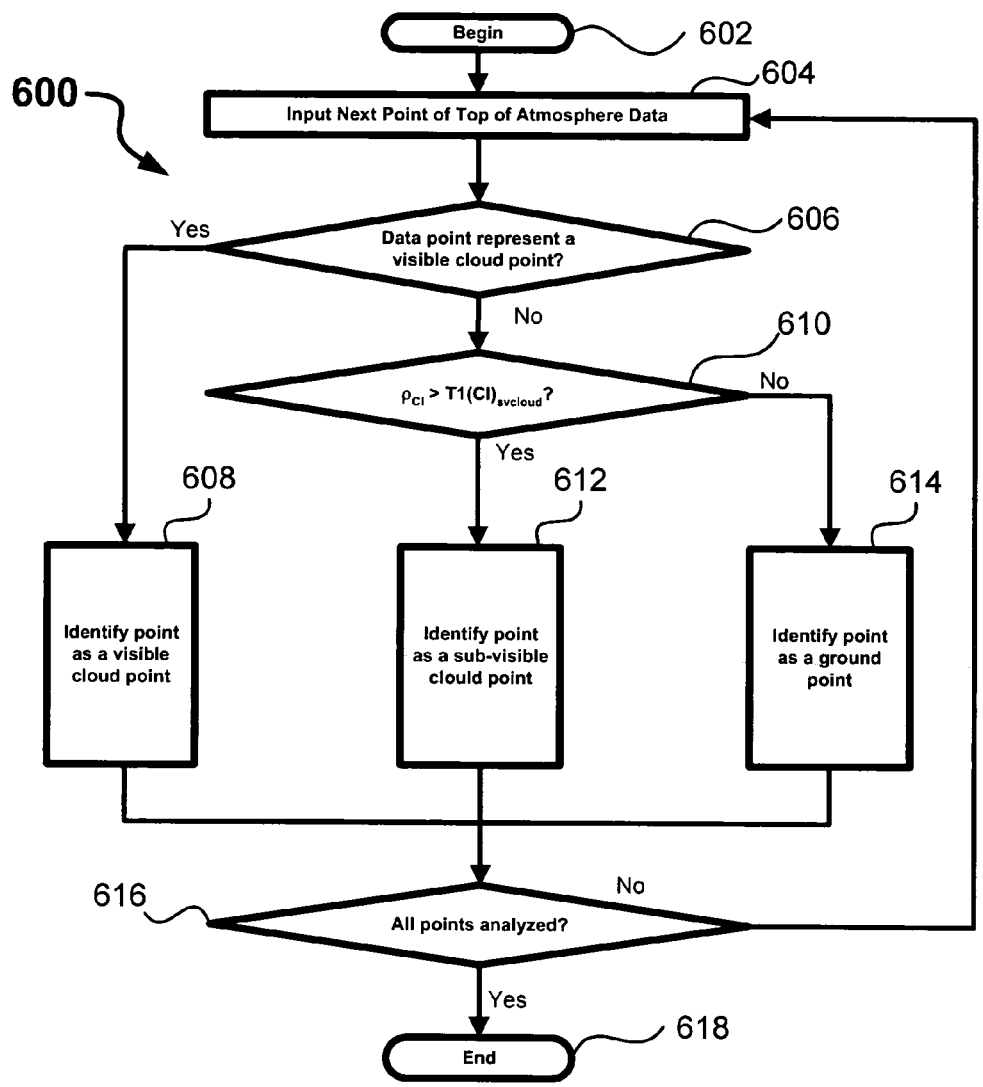
FIG. 6 is a flowchart of a routine for detecting presence of visible clouds and detecting sub-visible clouds according to an embodiment of the present invention.

FIG. 6 shows a routine 600 according to an embodiment of the present invention for detecting presence of sub-visible clouds as well as detecting presence of visible clouds. In the routine 600, it is first determined if the data point indicates the presence of a visible cloud, then it is determined if the data point indicates the presence of a sub-visible cloud.

The routine 600 begins at a block 602. At a block 604, a next point of top of atmosphere data is selected and input for processing. At a decision block 606, it is determined whether the data point indicates the presence of a visible cloud point. Whether the data point indicates the presence of a visible cloud, as previously described, may be determined using thermal imaging, or using another process. If at the decision block 606 it is determined that the data point indicates the presence of a visible cloud, at a block 608 the data point is classified as a visible cloud point. If at the decision block 606 it is determined that the data point does not indicate the presence of a visible cloud, then at a decision block 610 it is determined if the cirrus band reflectance of the data point exceeds the cirrus band reflectance threshold for a sub-visible cloud in accordance with the following Equation (5):

$$\rho_{CI} > T1(CI)_{svcloud} \tag{5}$$

In one embodiment, the cirrus band approximately includes 1.88 μm wavelength and/or 1.38 μm wavelength cirrus bands. However, other cirrus bands that are similarly located within atmospheric water vapor absorption features suitably may be used with embodiments of the present invention.

In one particular embodiment, the sub-visible cirrus band reflectance threshold for detection of sub-visible cirrus clouds T1(CI) includes approximately a top-of-atmosphere reflectance of 0.01. The T1(CI) threshold selected may be a function of the sensor capability to reject effects of "out-of-band" radiation in its cirrus band, a function of sensor signal to noise ratio, and/or a function of the intended image processing end product error budget allocated to undetected thin cirrus clouds. The useful T1(CI) detection threshold for a given scene segment will also be a function of the influence of atmospheric water vapor and/or underlying Earth surface reflectance in preventing or enabling Earth-surface-reflected radiation to penetrate the atmosphere, reach the sensor, and act as contamination in the cirrus band.

If, at the decision block 610 it is determined that the cirrus band reflectance $\rho_{CI}$ of the data point exceeds the sub-visible cloud cirrus-band reflectance threshold T1(CI), then at a block 612 the data point is classified as representing a sub-visible cloud point. On the other hand, if at the decision block 610 it is determined that the cirrus-band reflectance of the data point does not exceed the cirrus-band reflectance threshold T1(CI), having already established at the decision block 606 that the data point does not indicate presence of a visible cloud, at a block 614 the data point is classified as a ground point.

At a decision block 616 it is determined whether all the data points for which analysis is desired have been tested according to the routine 600. If not all the desired data points have been tested, the routine 600 loops to the block 604 to receive and evaluate the next data point. On the other hand, if it is determined at the decision block 616 that all the desired data points have been evaluated, the routine ends at the block 618.

Figure 7:
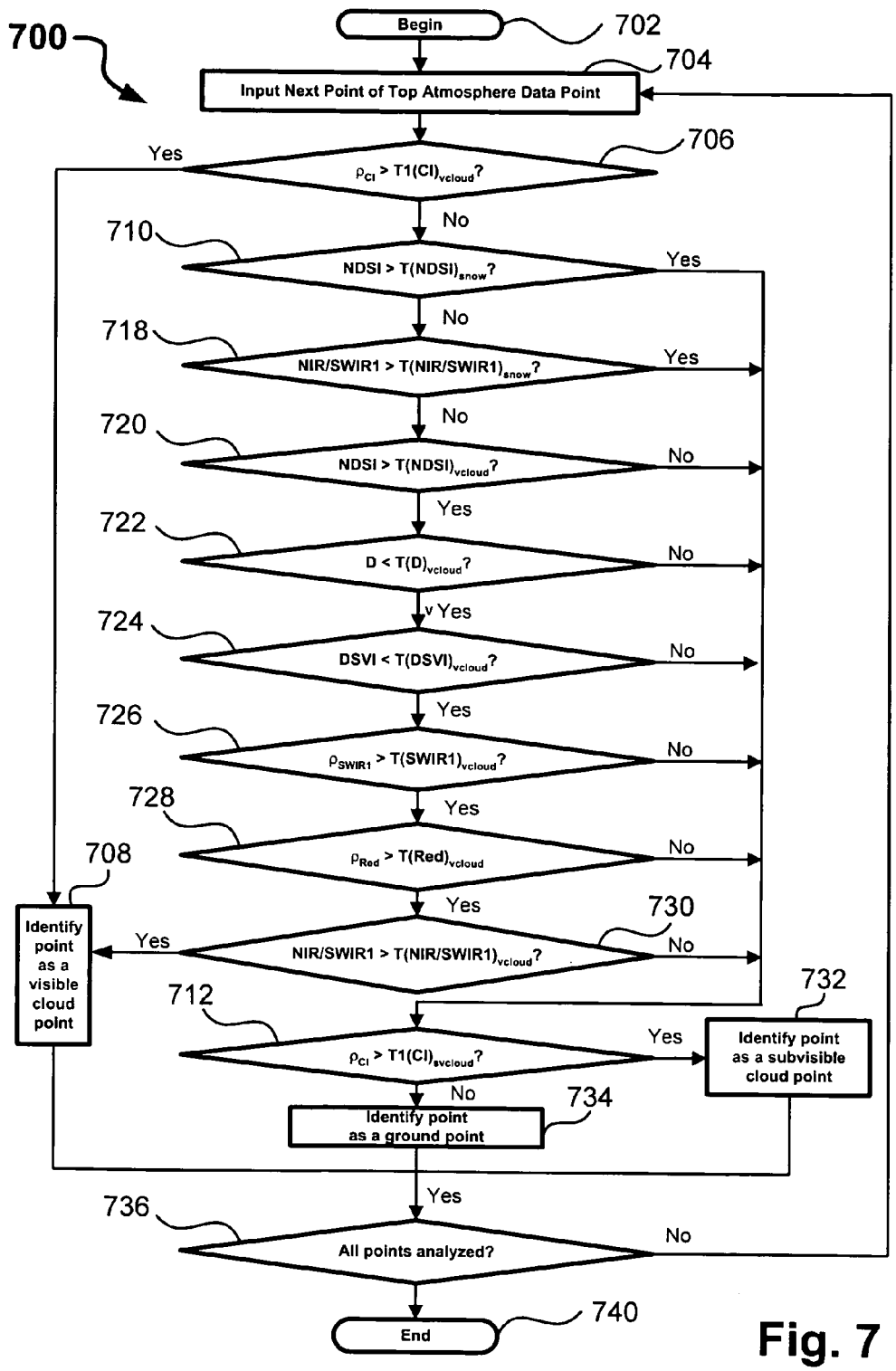
FIG. 7 is a flowchart of a routine according to an embodiment of the present invention for detecting presence of visible and sub-visible clouds using visible, near-infrared, and short wavelength infrared data.

FIG. 7 shows a routine 700 to determine the presence of both visible and sub-visible clouds using visible, near-infrared, and short-wavelength infrared data. In previously described routines 300 (FIG. 3) and 400 (FIG. 4), the threshold values were established for detection of visible clouds. As a result, the cloud threshold values have been re-labeled herein as visible cloud threshold values to clarify which tests are directed to detecting visible clouds distinct from tests used to discern the presence of sub-visible clouds in accordance with embodiments of the present invention.

The routine 700 begins at a block 702, and a next point of top of atmosphere, visible, near-infrared, and short-wavelength infrared data is submitted for processing at a block 704. At a block 706, a comparison of the $\rho_{CI}$ to a cirrus-band threshold visible cloud threshold value T1(CI)$_{vcloud}$ is made. If $\rho_{CI}$ exceeds the visible cloud threshold value, the data point is classified as a visible cloud point at a block 708. If not, the routine 700 proceeds to a decision block 710 to make a further comparison of whether the data point represents a visible cloud point.

In one particular embodiment, the $\rho_{CI}$ comparison at the block 706 is made at a wavelength of 1.88 μm. At this wavelength, the reflectance has been determined to be more reliable than at slightly lower wavelengths. Of course, in alternate embodiments, $\rho_{CI}$ may be tested at wavelengths other than 1.88 μm, such as at 1.38 μm or other cirrus bands.

If the comparison of $\rho_{CI}$ at the block 706 to make an initial determination of whether the data point is a visible cloud point did not result in the data point being classified as a visible cloud point at the block 708, additional comparisons can be made to further differentiate whether the data point is a cloud point or a non-cloud point. The comparisons and number of comparisons selected suitably are chosen to balance between computational simplicity and classification precision. Generally, as a greater number of comparisons are performed, greater precision may be obtained in determining presence of visible cloud points. Nonetheless, selecting a fewer number of comparisons may result in a desirable degree of accuracy with fewer comparisons and/or calculations being made.

More specifically, if the comparison of the data point at the block 706 results in the data point not being identified as a visible cloud point at the block 708, at a decision block 710 the NDSI is compared to an NDSI snow threshold value. This comparison may eliminate data points showing snow. If the data point NDSI is greater than the NDSI snow threshold value, the data point may reflect a snow point. Again, the NDSI threshold value may be empirically determined using other information from which data points have previously been classified as cloud points or non-cloud points. If at the decision block 710 the NDSI exceeds the NDSI snow threshold value, the data point is identified as not being a visible cloud point, and then the data point is evaluated at a decision block 712 to determine whether the data point indicates presence of a sub-visible cloud as will be described further below.

It will be appreciated how threshold values like the NDSI snow threshold value compared at the decision block 710 can affect classification precision. If, for example, the NDSI snow threshold is lowered, more data points may be classified as not being visible-cloud points. If analysis reveals that this revision results in a net improvement in classification accuracy, application of further comparisons in the routine 700 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of land cover, location and season will incorporate a predetermined classification accuracy into embodiments of the present invention.

If the comparison of the data point at the decision block 710 results in the data point not being identified as a snow point, then at a decision block 718, a comparison of a ratio of the near infrared data to the short-wavelength infrared data, NIR/SWIR1, to a NIR/SWIR1 snow threshold value is made to potentially eliminate additional data points showing snow. If the NIR/SWIR1 value exceeds the NIR/SWIR1 snow threshold value, the data point is identified as not being a visible-cloud point and the routine 700 proceeds to the decision block 712.

If the comparison of the data point at the decision block 718 results in the data point not being identified as a snow point, then at a decision block 720 a comparison of the NDSI value to an NDSI cloud threshold value is made to potentially eliminate data points showing bright ground. If the NDSI value is less than the NDSI cloud threshold value, the data point is identified as not being a visible-cloud point and the routine 700 proceeds to the decision block 712.

If the comparison of the data point at the decision block 720 results in the data point not being identified as a bright ground point, then at a decision block 722 a comparison of the D variable is made with a D variable visible cloud threshold to potentially eliminate data points showing vegetation. If the D variable is greater than the D variable visible cloud threshold, the data point is identified as not being a visible-cloud point and the routine 700 proceeds to the decision block 712.

If the comparison of the data point at the decision block 722 results in the data point not being identified as a vegetation point, then at a decision block 724 a comparison of a D spatial variability index, DSVI, is made with a DSVI visible cloud threshold to potentially eliminate data points showing non-smooth features as previously described. If the DSVI is greater than the DSVI visible cloud threshold value, the data point is identified as not being a visible-cloud point and the routine 700 proceeds to the decision block 712.

If the comparison of the data point at the block 724 results in the data point not being identified as a non-smooth feature, then at a decision block 726 a comparison of the short-wavelength reflectance, $\rho_{SWIR1}$, is made to a short-wavelength reflectance visible cloud threshold to potentially eliminate data points showing dark features. If $\rho_{SWIR1}$ is less than the short-wavelength reflectance visible cloud threshold, the data point is identified as not being a visible cloud point and the routine 700 proceeds to the decision block 712.

If the comparison of the data point at the block 726 results in the data point not being identified as a dark feature, then at a decision block 728 a comparison of $\rho_{Red}$ to a red wavelength visible cloud threshold value is made to eliminate additional data points showing dark features. If $\rho_{Red}$ is less than the red wavelength visible cloud threshold value, the data point is identified as not being a visible cloud point and the routine 700 proceeds to the decision block 712.

If the comparison of the data point at the block 728 results in the data point not being identified as a dark feature, then at a decision block 730 a comparison of a ratio of the NIR/SWIR1 to a NIR/SWIR1 visible cloud threshold value is made potentially to eliminate additional data points showing bright ground. If the NIR/SWIR1 value is less than the NIR/SWIR1 visible cloud threshold value the data point is identified as not being a visible cloud point and the routine 700 proceeds to the decision block 712. On the other hand, if the NIR/SWIR1 value is greater than the NIR/SWIR1 visible cloud threshold value, the data point is classified as a visible cloud point at the block 708.

For data points not classified as being a visible cloud point at the block 708, at the decision block 712 it is determined if the cirrus band reflectance of the data point is greater than the cirrus band sub-visible cloud threshold. If the cirrus band reflectance of the data point is determined to exceed the sub-visible cloud threshold, at the block 732 the data point is classified as a sub-visible cloud point. On the other hand, if it is determined at the decision block 712 that the cirrus-band reflectance of the data point does not exceed the sub-visible cloud threshold, at a block 734 the data point is identified as a ground point.

Once the data points have been classified as one of a cloud point at the block 708, a sub-visible cloud point at the block 732, or as a ground point at the block 734, at a decision block 736 it is determined if all data points of interest have been classified. If not, the routine 700 loops to the block 704 where the next data point is received for evaluation. However, if it is determined at the block 736 that all the data points of interest have been analyzed, the routine 700 ends at the block 740.

As previously described, the routine 700 uses visible cloud and sub-visible cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and winter seasons, just as the threshold values will vary between permanent wetlands and arid areas, etc.

Figure 8:
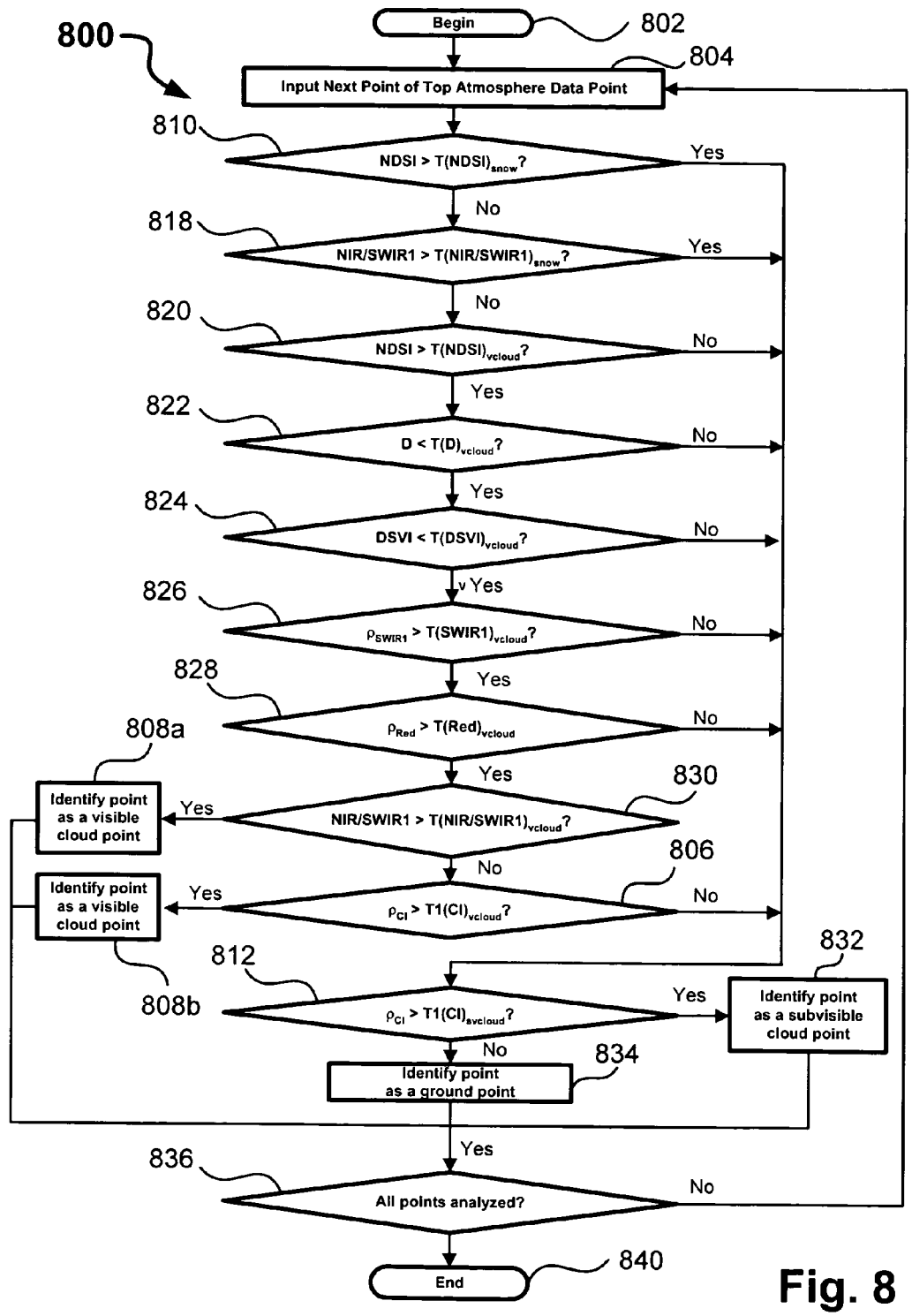
FIG. 8 is a flowchart of a routine according to another embodiment of the present invention.

FIG. 8 shows another embodiment of a routine 800 to determine the presence of both visible and sub-visible clouds using visible, near-infrared, and short-wavelength infrared data. The routine 800 advantageously supports correction for thin cirrus effects in regions where there are no underlying low clouds. Generally, the routine 800 employs the same comparisons, but the comparisons are ordered differently. Note that in routines 300 (FIG. 3) and 700 (FIG. 7) the cirrus band visible cloud test at blocks 306 and 706 are applied before other visible cloud tests, and if visible cloud is detected with the cirrus band test the other visible cloud tests are not applied. Applying the cirrus band visible cloud test first is computing-resource efficient. However, applying the cirrus band visible cloud test first does not allow separation of data points with visible middle and low- and middle-altitude clouds from those with thin but visible high cloud that are detectable only with the cirrus band. This is true, for example, in the case where there are no detectable lower clouds. Both thin but visible high cirrus clouds and sub-visible high cirrus clouds are potentially correctible in order to enhance utility of spectral imagery for later applications. However, cirrus-corrected data points generally have utility for land-surface applications only in the case where middle and/or low altitude clouds are not present to obscure the land surface beneath the high cirrus clouds. Additionally, cirrus corrections are possible with useful accuracy only to some arbitrary cirrus reflectance threshold above that of visibility, such as where the reflectance is approximately 0.03), which it is assumed coincides with the threshold at which thin but visible cirrus clouds are detectible with the non-cirrus-band tests.

In routine 800, the computing resources to apply the set of non-cirrus-band visible cloud tests 810, 818, 820, 822, 824, 826, 828 and 830 are committed first at each data point in order to capture all visible low- and middle-altitude cloud points and relatively thick high cloud points that satisfy those tests into block 808a. The cirrus band visible cloud test at the block 806 is then applied to those data points failing the non-cirrus-band sequence of visible cloud tests. Visible cloud points meeting only the cirrus band test are collected at the block 808b. Subsequently, data points failing both types of visible cloud tests are subjected to the sub-visible cirrus cloud test at the block 812, and sub-visible cloud points are collected at the block 832.

Other applications are therefore made possible. Visible cloud masks, as discussed for routines 300 and 700, may still be produced from the data points collected at the blocks 808a and 808b. In addition, cirrus cloud corrections may be applied to the sub-visible cirrus cloud points collected into block 832 and to the thin but visible cirrus cloud points collected at the block 808b.

We do not here provide a detailed method for making the corrections to visible, near infrared, and short-wave infrared imagery for presence of thin visible and subvisible clouds. Embodiments of the present invention provide an overall cloud detection approach for implementation in an automated imagery processing framework with intent to facilitate automated application and interpretation of those corrections. A thin cirrus correction approach would take advantage of the relatively flat spectral dependence of cirrus cloud reflectance across the visible, near infrared, and short-wave infrared spectral range of the processed imagery, except for the effects of ice and water vapor absorption experienced by the cirrus-reflected radiance measured in the cirrus band. Corrections for upwelling cirrus-cloud-reflected radiance "contamination" would be computed based upon measured reflectance in the cirrus band near each data point, adjusted for the above-mentioned ice and water vapor absorption in the cirrus band, and then subtracted from other spectral band reflectance values at each data point. A compatible approach to making these cirrus corrections using 1.38 micron cirrus band measurements, that would be equally applicable at 1.88 micron cirrus band measurements is described in other publications. For example, such an approach is explained in "Correction of thin cirrus path radiances in the 0.4–1.0 micron spectral region using the sensitive 1.375 micron cirrus detecting channel," B.-C. Gao, Y. J. Kaufman, W. Han and W. J. Wiscombe, Journal of Geophysical Research, Vol. 103, No. D24, pp. 32,169–32, 176, Dec. 27, 1998, and "An algorithm using visible and 1.38 micron channels to retrieve cirrus cloud reflectances from aircraft and satellite data," B.-C. Gao, P. Yang, W. Han, R.-R. Li, and W. J. Wiscombe, IEEE Transactions on Geoscience and Remote Sensing, Vol. 40, No. 8, August 2002. Other approaches to detailed correction for thin cirrus cloud effects in visible, near infrared, and short-wave infrared imagery may also be facilitated by approaches to cloud detection in automated imagery processing previously described.

The routine 800 begins at a block 802, and a next point of top of atmosphere, visible, near-infrared, and short-wavelength infrared data is submitted for processing at a block 804. At a decision block 810 the NDSI is compared to an NDSI snow threshold value. This comparison may eliminate data points showing snow. If the data point NDSI is greater than the NDSI snow threshold value, the data point may reflect a snow point. Again, the NDSI threshold value may be empirically determined using other information from which data points have previously been classified as cloud points or non-cloud points. If at the decision block 810 the NDSI exceeds the NDSI snow threshold value, the data point is identified as not being a visible cloud point, and then the data point is evaluated at a decision block 812 to determine whether the data point indicates presence of a sub-visible cloud as will be described further below.

It will be appreciated how threshold values like the NDSI snow threshold value compared at the decision block 810 can affect classification precision. If, for example, the NDSI snow threshold is lowered, more data points may be classified as not being visible-cloud points. If analysis reveals that this revision results in a net improvement in classification accuracy, application of further comparisons in the routine 800 may be avoided. Adjusting the thresholds in the tests described will determine how the individual data points in thinly cloud covered areas are classified. Accordingly, selection of thresholds based on empirical analysis of tested values for test data points known to be cloud points or non-cloud points over specific categories of land cover, location and season will incorporate a predetermined classification accuracy into embodiments of the present invention.

If the comparison of the data point at the decision block 810 results in the data point not being identified as a snow point, then at a decision block 818, a comparison of a ratio of the near infrared data to the short-wavelength infrared data, NIR/SWIR1, to a NIR/SWIR1 snow threshold value is made to potentially eliminate additional data points showing snow. If the NIR/SWIR1 value exceeds the NIR/SWIR1 snow threshold value, the data point is identified as not being a visible-cloud point and the routine 800 proceeds to the decision block 812.

If the comparison of the data point at the decision block 818 results in the data point not being identified as a snow point, then at a decision block 820 a comparison of the NDSI value to an NDSI cloud threshold value is made to potentially eliminate data points showing bright ground. If the NDSI value is less than the NDSI cloud threshold value, the data point is identified as not being a visible-cloud point and the routine 800 proceeds to the decision block 812.

If the comparison of the data point at the decision block 820 results in the data point not being identified as a bright ground point, then at a decision block 822 a comparison of the D variable is made with a D variable visible cloud threshold to potentially eliminate data points showing vegetation. If the D variable is greater than the D variable visible cloud threshold, the data point is identified as not being a visible-cloud point and the routine 800 proceeds to the decision block 812.

If the comparison of the data point at the decision block 822 results in the data point not being identified as a vegetation point, then at a decision block 824 a comparison of a D spatial variability index, DSVI, is made with a DSVI visible cloud threshold to potentially eliminate data points showing non-smooth features as previously described. If the DSVI is greater than the DSVI visible cloud threshold value, the data point is identified as not being a visible-cloud point and the routine 800 proceeds to the decision block 812.

If the comparison of the data point at the block 824 results in the data point not being identified as a non-smooth feature, then at a decision block 826 a comparison of the short-wavelength reflectance, $\rho_{SWIR1}$, is made to a short-wavelength reflectance visible cloud threshold to potentially eliminate data points showing dark features. If $\rho_{SWIR1}$ is less than the short-wavelength reflectance visible cloud threshold, the data point is identified as not being a visible cloud point and the routine 800 proceeds to the decision block 812.

If the comparison of the data point at the block 826 results in the data point not being identified as a dark feature, then at a decision block 828 a comparison of $\rho_{Red}$ to a red wavelength visible cloud threshold value is made to eliminate additional data points showing dark features. If $\rho_{Red}$ is less than the red wavelength visible cloud threshold value, the data point is identified as not being a visible cloud point and the routine 800 proceeds to the decision block 812.

If the comparison of the data point at the block 828 results in the data point not being identified as a dark feature, then at a decision block 830 a comparison of a ratio of the NIR/SWIR1 to a NIR/SWIR1 visible cloud threshold value is made potentially to eliminate additional data points showing bright ground. If the NIR/SWIR1 value is less than the NIR/SWIR1 visible cloud threshold value the data point is identified as not being a visible cloud point and the routine 800 proceeds to the decision block 806. On the other hand, if the NIR/SWIR1 value is greater than the NIR/SWIR1 visible cloud threshold value, the data point is classified as a visible cloud point at the block 808a.

At a decision block 806, a comparison of the $\rho_{CI}$ to a cirrus-band threshold visible cloud threshold value $T1(CI)_{vcloud}$ is made. If $\rho_{CI}$ exceeds the visible cloud threshold value at the block 806, the data point is classified as a visible cloud point at a block 808b.

For data points not classified as being a visible cloud point at the block 808b, at the decision block 812 it is determined if the cirrus band reflectance of the data point is greater than the cirrus band sub-visible cloud threshold. If the cirrus band reflectance of the data point is determined to exceed the sub-visible cloud threshold, at the block 832 the data point is classified as a sub-visible cloud point. On the other hand, if it is determined at the decision block 812 that the cirrus-band reflectance of the data point does not exceed the sub-visible cloud threshold, at a block 834 the data point is identified as a ground point.

In one particular embodiment, as previously described, the $\rho_{CI}$ comparisons at blocks 806 and 812 are made at a wavelength of 1.88 μm. At this wavelength, the reflectance has been determined to be more reliable than at slightly lower wavelengths. Of course, in alternate embodiments, $\rho_{CI}$ may be tested at wavelengths other than 1.88 μm, such as at 1.38 μm or other cirrus bands.

Once the data points have been classified as one of a cloud point at the block 808a or 808b, a sub-visible cloud point at the block 832, or as a ground point at the block 834, at a decision block 836 it is determined if all data points of interest have been classified. If not, the routine 800 loops to the block 804 where the next data point is received for evaluation. However, if it is determined at the block 836 that all the data points of interest have been analyzed, the routine 800 ends at the block 840.

As previously described, the routine 800 uses visible cloud and sub-visible cloud thresholds empirically derived from manual or other studies of overhead imaging data. The threshold values may vary depending on the nature of the area of interest and the season during which the imaging data is captured. For example, threshold values for forests or closed shrub areas will vary between summer/tropical seasons and winter seasons, just as the threshold values will vary between permanent wetlands and arid areas, etc.

Figure 9:
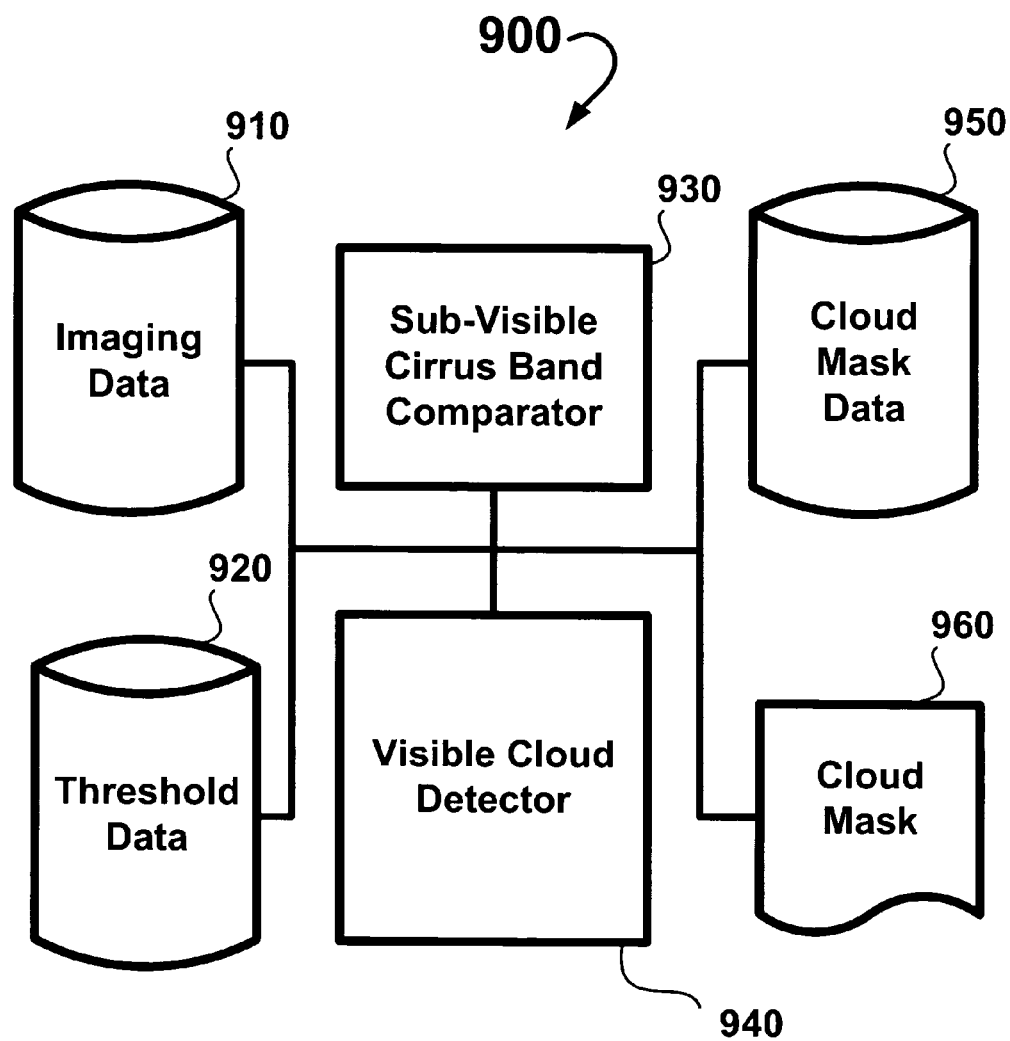
FIG. 9 is a block diagram of a system according to an embodiment of the present invention for detecting sub-visible clouds.

FIG. 9 shows a system 900 according to an embodiment of the present invention. Imaging data 910, including imaging data from at least one data point, is received. A set of threshold data 920, such as the parameters previously described in connection with FIGS. 6, 7, and 8 supplied to the system for comparison. A cirrus band comparator 930 compares the cirrus-band reflectance value for each data point being evaluated with a cirrus band sub-visible cloud threshold to detect sub-visible clouds. A visible cloud detector 940, using thermal imaging, using visible, near visible infrared, and short-wavelength infrared data, or using another process to determine the presence of visible clouds is used to determine the presence of visible clouds as desired. If the cirrus band reflectance of the data point exceeds the sub-visible cirrus-band threshold, the data point is classified as a sub-visible cloud point in cloud mask data 950 and/or a cloud mask 960. If the data point is identified as representing presence of a visible cloud, the data point is classified as a visible cloud point in the cloud mask data 950 and/or the cloud mask 960. The system 900 suitably is applied to all data points in the imaging data 910 to generate cloud mask data 950 and/or a cloud mask 960 for the imaging data 910.

It will be appreciated that, in one embodiment of the invention, the determination as to acceptability of accuracy provided by a given set of tests and thresholds would be determined by processing a representative set of imagery off-line, and by evaluating resultant cloud masks in comparison with "truth" cloud masks produced by expert analysis. Adjustments would be iterated and evaluated for optimization, and production test hierarchy and thresholds would then be adjusted for subsequent on-line production runs.

It should be understood that the system 900 shown in FIG. 9 may have a variety of alternate embodiments, and that the invention is not limited to the particular system embodiment shown in FIG. 9. For example, one or more of the various components of the system 900 may be combined with other components, or may be divided into separate components, to produce alternate embodiments of systems in accordance with the present invention. Alternately, in a representative embodiment, the system 900 includes a computer having a central processing unit (CPU) and a memory component. The memory component may include one or more memory modules, such as Random Access Memory (RAM) modules, Read Only Memory (ROM) modules, Dynamic Random Access Memory (DRAM) modules, and any other suitable memory modules. The computer may also include an input/output (I/O) component that may include a variety of known I/O devices, including network connections, video and graphics cards, disk drives or other computer-readable media drives, displays, or any other suitable I/O modules. In one particular aspect, a machine-readable medium may be used to store a set of machine-readable instructions (e.g. a computer program) into the computer, wherein the machine-readable instructions embody a method in accordance with the teachings of the present invention. The machine-readable medium may be any type of medium that can store data that is readable by the computer, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 900. Alternately, the machine-readable instructions may be implemented directly into one or more components of the system 900 without the assistance of the machine-readable medium.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for determining whether a data point of an imaging study indicates a presence of a sub-visible cloud using data including visible, near-infrared, and short wavelength infrared data, the method comprising:

selecting a data point from an imaging study of an area potentially covered by at least one of visible clouds and sub-visible clouds; and determining whether the data point is covered by visible cloud; and determining whether the data point indicates presence of a sub-visible cloud including:

comparing a cirrus-band reflectance of the data point with a sub-visible cirrus-band reflectance threshold; and classifying the data point as a sub-visible cloud point if the cirrus-band reflectance of the data point exceeds the sub-visible cirrus band reflectance threshold.

2. The method of claim 1, wherein the cirrus-band is approximately a 1.88 µm wavelength cirrus band.

3. The method of claim 1, wherein the cirrus-band is approximately a 1.38 µm wavelength cirrus band.

4. The method of claim 1, wherein the sub-visible cirrus band reflectance threshold is approximately 0.01.

5. The method of claim 1, wherein the method is iterated for each of a plurality of data points in a set of imaging data.

6. The method of claim 1, further comprising determining whether the data point indicates the presence of a visible cloud.

7. The method of claim 6, wherein the determining of whether the data point indicates the presence of a visible cloud is made before the determining of whether the data point indicates the presence of a sub-visible cloud.

8. The method of claim 6, wherein the determining of whether the data point indicates the presence of a visible cloud using data including visible, near-infrared, and short wavelength infrared data including:

classifying the data point as a visible cloud point if the cirrus-band reflectance of the data point exceeds the visible cirrus-band reflectance threshold; and when the cirrus-band reflectance of the data point does not exceed the visible cirrus-band reflectance threshold, performing a further analysis of the data point including:

performing at least one additional comparison of an additional cloud indicator with an additional cloud indicator threshold, the additional cloud indicator being derived from at least one of the visible, near-infrared, and short wavelength infrared data; and classifying the data point as one of a visible cloud point or as not being a visible cloud point.

9. The method of claim 8, wherein the additional cloud indicator threshold is empirically derived from examining additional cloud indicator values for representative sets of empirical data points identified as cloud points or non-cloud points.

10. The method of claim 6, wherein the determining of whether the data point indicates the presence of a visible cloud is made using thermal imaging.

11. A method for determining whether a data point of an imaging study indicates a presence of a cloud using data including visible, near-infrared, and short wavelength infrared data, the method comprising:

selecting a data point from an imaging study of an area potentially covered by at least one of visible clouds and sub-visible clouds;

determining whether the data point indicates presence of a visible cloud; and when it is determined that the data point does not indicate the presence of a visible cloud, determining whether the data point indicates presence of a sub-visible cloud including:

comparing a cirrus-band reflectance of the data point with a sub-visible cirrus-band reflectance threshold; and classifying the data point as a sub-visible cloud point if the cirrus-band reflectance of the data point exceeds the sub-visible cirrus band reflectance threshold.

12. The method of claim 11, wherein the cirrus-band is approximately a 1.88 µm wavelength cirrus band.

13. The method of claim 11, wherein the cirrus-band is approximately a 1.38 µm wavelength cirrus band.

14. The method of claim 11, wherein the sub-visible cirrus band reflectance threshold is approximately 0.01.

15. The method of claim 11, wherein the method is iterated for each of a number of data points in a set of imaging data.

16. The method of claim 11, wherein the determining of whether the data point indicates the presence of a visible cloud using data including visible, near-infrared, and short wavelength infrared data including:

classifying the data point as a visible cloud point if the cirrus-band reflectance of the data point exceeds the visible cirrus-band reflectance threshold; and when the cirrus-band reflectance of the data point does not exceed the visible cirrus-band reflectance threshold, performing a further analysis of the data point including:

performing at least one additional comparison of an additional cloud indicator with an additional cloud indicator threshold, the additional cloud indicator being derived from at least one of the visible, near-infrared, and short wavelength infrared data; and classifying the data point as one of a visible cloud point or not a visible cloud point.

17. The method of claim 16, wherein the additional cloud indicator threshold is empirically derived from examining additional cloud indicator values for representative sets of empirical data points identified as cloud points or non-cloud points.

18. A computer-readable medium having stored thereon instructions for determining whether a data point of an imaging study indicates a presence of a sub-visible cloud using data including visible, near-infrared, and short wavelength infrared data, the computer-readable medium comprising:

a first computer program portion adapted to select a data point from an imaging study of an area potentially covered by at least one of visible clouds and sub-visible clouds; and a second computer program portion adapted to determine whether the data point indicates presence of a sub-visible cloud including:

a third computer program portion adapted to compare a cirrus-band reflectance of the data point with a sub-visible cirrus-band reflectance threshold; and a fourth computer program portion adapted to classify the data point as a sub-visible cloud point if the cirrus-band reflectance of the data point exceeds the sub-visible cirrus band reflectance threshold.

19. The computer-readable medium of claim 18, wherein the cirrus-band is approximately a 1.88 µm wavelength cirrus band.

20. The computer-readable medium of claim 18, wherein the cirrus-band is approximately a 1.38 µm wavelength cirrus band.

21. The computer-readable medium of claim 18, wherein the sub-visible cirrus band reflectance threshold is approximately 0.01.

22. The computer-readable medium of claim 18, further comprising a fifth computer program portion adapted to iterate the instructions for each of a plurality of data points in a set of imaging data.

23. The computer-readable medium of claim 18, further comprising a sixth computer program portion adapted to determine whether the data point indicates the presence of a visible cloud.

24. The computer-readable medium of claim 23, wherein the determining of whether the data point indicates the presence of a visible cloud is made before the determining of whether the data point indicates the presence of a sub-visible cloud.

25. The computer-readable medium of claim 23, wherein the determining of whether the data point indicates the presence of a visible cloud using data including visible, near-infrared, and short wavelength infrared data including:

a seventh computer program portion adapted to classify the data point as a visible cloud point if the cirrus-band reflectance of the data point exceeds the visible cirrus-band reflectance threshold; and when the cirrus-band reflectance of the data point does not exceed the visible cirrus-band reflectance threshold, an eighth computer program portion adapted to perform a further analysis of the data point including:

a ninth computer program portion adapted to perform at least one additional comparison of an additional cloud indicator with an additional cloud indicator threshold, the additional cloud indicator being derived from at least one of the visible, near-infrared, and short wavelength infrared data; and a tenth computer program portion adapted to classify the data point as one of a visible cloud point or as not a visible cloud point.

26. The computer-readable medium of claim 25, wherein the additional cloud indicator threshold is empirically derived from examining additional cloud indicator values for representative sets of empirical data points identified as visible cloud points or non-visible cloud points.

27. The computer-readable medium of claim 23, wherein the determining of whether the data point indicates the presence of a visible cloud is made using thermal imaging.

28. A computer-readable medium having stored thereon instructions for determining whether a data point of an imaging study indicates a presence of a cloud using data including visible, near-infrared, and short wavelength infrared data, the computer-readable medium comprising:
   a first computer program portion adapted to select a data point from an imaging study of an area potentially covered by at least one of visible clouds and sub-visible clouds;
   a second computer program portion adapted to determine whether the data point indicates presence of a visible cloud; and
   a third computer program portion adapted to determine, when it is determined that the data point does not indicate the presence of a visible cloud, whether the data point indicates presence of a sub-visible cloud including:
      a fourth computer program portion adapted to compare a cirrus-band reflectance of the data point with a sub-visible cirrus-band reflectance threshold; and
      a fifth computer program portion adapted to classify the data point as a sub-visible cloud point if the cirrus-band reflectance of the data point exceeds the sub-visible cirrus band reflectance threshold.

29. The computer-readable medium of claim 28, wherein the cirrus-band is approximately a 1.88 μm wavelength cirrus band.

30. The computer-readable medium of claim 28, wherein the cirrus-band is approximately a 1.38 μm wavelength cirrus band.

31. The computer-readable medium of claim 28, wherein the sub-visible cirrus band reflectance threshold is approximately 0.01.

32. The computer-readable medium of claim 28, further comprising a sixth computer program portion adapted to iterate the instructions for each of a plurality of data points in a set of imaging data.

33. The computer-readable medium of claim 28, wherein the determining of whether the data point indicates the presence of a visible cloud using data including visible, near-infrared, and short wavelength infrared data including:
   a seventh computer program portion adapted to classify the data point as a visible cloud point if the cirrus-band reflectance of the data point exceeds the visible cirrus-band reflectance threshold; and
   when the cirrus-band reflectance of the data point does not exceed the visible cirrus-band reflectance threshold, an eighth computer program portion adapted to perform a further analysis of the data point including:
      a ninth computer program portion adapted to perform at least one additional comparison of an additional cloud indicator with an additional cloud indicator threshold, the additional cloud indicator being derived from at least one of the visible, near-infrared, and short wavelength infrared data; and
      a tenth computer program portion adapted to classify the data point as one of a visible cloud point or as not a visible cloud point.

34. The computer-readable medium of claim 33, wherein the additional cloud indicator threshold is empirically derived from examining additional cloud indicator values for representative sets of empirical data points identified as cloud points or non-cloud points.

35. A system for determining whether a data point of an imaging study indicates a presence of a sub-visible cloud using data including visible, near-infrared, and short wavelength infrared data, the system comprising:
   a data point selector to configured to select a data point from an imaging study of an area potentially covered by at least one of visible clouds and sub-visible clouds; and
   a sub-visible cloud detector configured to determine whether the data point indicates presence of a sub-visible cloud including:
      a cirrus-band comparator configured to compare a cirrus-band reflectance of the data point with a sub-visible cirrus-band reflectance threshold; and
      a data point classifier configured to classify the data point as a sub-visible cloud point if the cirrus-band reflectance of the data point exceeds the sub-visible cirrus band reflectance threshold.

36. The system of claim 35, wherein the cirrus-band is approximately a 1.88 μm wavelength cirrus band.

37. The system of claim 35, wherein the cirrus-band is approximately a 1.38 μm wavelength cirrus band.

38. The system of claim 35, wherein the sub-visible cirrus band reflectance threshold is approximately 0.01.

39. The system of claim 35, wherein the data point selector is further configured to select each of a plurality of data points in a set of imaging data.

40. The system of claim 35, further comprising a visible cloud detector configured to determine whether the data point indicates the presence of a visible cloud.

41. The system of claim 35, wherein the visible cloud detector is further configured to determine whether the data point indicates the presence of a visible cloud before the sub-visible cloud detector determines the presence of a sub-visible cloud.

42. The system of claim 41, wherein the visible cloud detector determines the presence of a visible cloud using data including visible, near-infrared, and short wavelength infrared data including:
   a visible cirrus-band classifier configured to classify the data point as a visible cloud point if the cirrus-band reflectance of the data point exceeds the visible cirrus-band reflectance threshold; and
   when the visible cirrus-band reflectance of the data point does not classify the data point as a visible cloud point, an additional classifier configured to perform at least one additional comparison of an additional cloud indicator with an additional cloud indicator threshold, the additional cloud indicator being derived from at least one of the visible, near-infrared, and short wavelength infrared data and classify the data point as one of a visible cloud point or as not a visible cloud point based on the at least one additional comparison.

43. The system of claim 42, wherein the additional cloud indicator threshold is empirically derived from examining additional cloud indicator values for representative sets of empirical data points identified as cloud points or non-cloud points.

44. The system of claim 40, wherein the visible cloud detector is configured to detect presence of visible clouds using thermal imaging.

45. A system for determining whether a data point of an imaging study indicates a presence of a cloud using data including visible, near-infrared, and short wavelength infrared data, the method comprising:

a data point selector configured to select a data point from an imaging study of an area potentially covered by at least one of visible clouds and sub-visible clouds;

a visible cloud detector to determine whether the data point indicates the presence of a visible cloud; and a sub-visible cloud detector configured to determine, when the visible cloud detector has determined the data point does not indicate the presence of a visible cloud, whether the data point indicates presence of a sub-visible cloud including:

a cirrus-band comparator configured to compare a cirrus-band reflectance of the data point with a sub-visible cirrus-band reflectance threshold; and a data point classifier configured to classify the data point as a sub-visible cloud point if the cirrus-band reflectance of the data point exceeds the sub-visible cirrus band reflectance threshold.

46. The system of claim 45, wherein the cirrus-band is approximately a 1.88 μm wavelength cirrus band.

47. The system of claim 45, wherein the cirrus-band is approximately a 1.38 μm wavelength cirrus band.

48. The system of claim 45, wherein the sub-visible cirrus band reflectance threshold is approximately 0.01.

49. The system of claim 45, wherein the data point selector is further configured to select each of a plurality of data points in a set of imaging data.

50. The system of claim 45, wherein the visible cloud detector is further configured to determine whether the data point indicates the presence of a visible cloud after the sub-visible cloud detector determines the presence of a sub-visible cloud.

51. The system of claim 45, wherein the visible cloud detector determines the presence of a visible cloud using data including visible, near-infrared, and short wavelength infrared data including:

a visible cirrus-band classifier configured to classify the data point as a visible cloud point if the cirrus-band reflectance of the data point exceeds the visible cirrus-band reflectance threshold; and when the visible cirrus-band reflectance of the data point does not classify the data point as a visible cloud point, an additional classifier configured to perform at least one additional comparison of an additional cloud indicator with an additional cloud indicator threshold, the additional cloud indicator being derived from at least one of the visible, near-infrared, and short wavelength infrared data and classify the data point as one of a visible cloud point or as not a visible cloud point based on the at least one additional comparison.

52. The system of claim 51, wherein the additional cloud indicator threshold is empirically derived from examining additional cloud indicator values for representative sets of empirical data points identified as cloud points or non-cloud points.

53. The system of claim 45, wherein the visible cloud detector is configured to detect presence of visible clouds using thermal imaging.

\* \* \* \* \*